US012793218B2

(12) United States Patent
Ji et al.

(10) Patent No.: US 12,793,218 B2
(45) Date of Patent: Nov. 10, 2026

(54) IMAGE PROCESSING METHOD, IMAGE PROCESSING DEVICE, AND RECORDING MEDIUM STORING PROGRAM

(71) Applicant: NIKON CORPORATION, Tokyo (JP)

(72) Inventors: Yuanting Ji, Yokohama (JP); Yasushi Tanabe, Fujisawa (JP); Hiroshi Kasai, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 204 days.

(21) Appl. No.: 18/909,717

(22) Filed: Oct. 8, 2024

(65) Prior Publication Data

US 2025/0029250 A1 Jan. 23, 2025

Related U.S. Application Data

(63) Continuation of application No. PCT/JP2023/014304, filed on Apr. 6, 2023.

(30) Foreign Application Priority Data

Apr. 13, 2022 (JP) ................................ 2022-066636

(51) Int. Cl.
*G06T 7/00* (2017.01)
*G06V 10/44* (2022.01)
*G06V 10/60* (2022.01)

(52) U.S. Cl.
CPC ............ *G06T 7/0012* (2013.01); *G06V 10/44* (2022.01); *G06V 10/60* (2022.01);
(Continued)

(58) Field of Classification Search
CPC ...... G06V 10/44; G06V 10/60; G06T 7/0012; G06T 7/00; G06T 2207/10101;
(Continued)

(56) References Cited

U.S. PATENT DOCUMENTS 7,768,652 B2 * 8/2010 Everett ................ A61B 5/0066 356/497
8,542,899 B2 * 9/2013 Athelogou ............ G06T 7/0012 382/128
(Continued)

FOREIGN PATENT DOCUMENTS

JP 2015-000131 A 1/2015
JP 2019-150554 A 9/2019
(Continued)

OTHER PUBLICATIONS

Saxena et al., "Framework for quantitative three-dimensional choroidal vasculature analysis using optical coherence tomography" (pp. 4982-4996) (Year: 2021).*
(Continued)

*Primary Examiner* — Manav Seth
(74) *Attorney, Agent, or Firm* — Foley & Lardner LLP

(57) ABSTRACT

An image processing method, performed by a processor, includes: a step of acquiring OCT volume data including a choroid; a step of generating plural en-face images corresponding to plural planes having different depths, based on the OCT volume data; a step of deriving an image feature amount in each of the plural en-face images; and a step of identifying, as a boundary, an interval between en-face images in which the image feature amounts indicate a switch between presence and absence of choroidal blood vessels, based on the respective image feature amounts.

11 Claims, 17 Drawing Sheets

(52) U.S. Cl.
CPC ............... *G06T 2207/10101* (2013.01); *G06T 2207/30041* (2013.01); *G06T 2207/30101* (2013.01)

(58) Field of Classification Search
CPC . G06T 2207/30041; G06T 2207/30101; A61B 3/10; A61B 3/12
See application file for complete search history.

(56) References Cited

U.S. PATENT DOCUMENTS

| | | | | |
|---|---|---|---|---|
| 9,177,223 | B2 * | 11/2015 | Mudge | A61B 1/303 |
| 10,238,281 | B2 | 3/2019 | Isogai et al. | |
| 10,398,302 | B2 * | 9/2019 | Meyer | A61B 3/1233 |
| 10,885,330 | B2 * | 1/2021 | Kawase | A61B 3/102 |
| 11,419,495 | B2 * | 8/2022 | Hirokawa | A61B 3/102 |
| 11,887,288 | B2 * | 1/2024 | Yamazoe | G06T 11/60 |
| 2012/0257164 | A1 | 10/2012 | Zee et al. | |
| 2014/0294235 | A1 * | 10/2014 | Ishida | G06V 40/193<br>382/103 |
| 2014/0334703 | A1 * | 11/2014 | Farsiu | G06T 7/162<br>382/131 |
| 2016/0135683 | A1 * | 5/2016 | Yasuno | A61B 3/0025<br>351/246 |
| 2025/0299824 | A1 * | 9/2025 | Benech | G06T 7/0012 |

FOREIGN PATENT DOCUMENTS

| | | | | |
|---|---|---|---|---|
| JP | 2019150485 | A * | 9/2019 | A61B 3/10 |
| JP | 2021-079042 | A | 5/2021 | |
| WO | WO-2010080576 | A1 * | 7/2010 | A61B 3/1225 |
| WO | WO-2021/074960 | A1 | 4/2021 | |

OTHER PUBLICATIONS

Japanese Office Action issued in corresponding JP Application No. 2024-514933 Dated Jul. 1, 2025 (8 pages).

* cited by examiner 680L 680B 680M

IMAGE PROCESSING METHOD, IMAGE PROCESSING DEVICE, AND RECORDING MEDIUM STORING PROGRAM

CROSS-REFERENCE TO RELATED APPLICATION

This application is a continuation application of International Application No. PCT/JP2023/014304, filed Apr. 6, 2023, the disclosure of which is incorporated herein by reference in its entirety. Further, this application claims priority from Japanese Patent Application No. 2022-066636, filed Apr. 13, 2022, the disclosure of which is incorporated herein by reference in its entirety.

TECHNICAL FIELD

The present disclosure relates to an image processing method, an image processing device, and a program.

BACKGROUND ART

U.S. Pat. No. 10,238,281 discloses a technique for generating volume data of a subject eye using optical coherence tomography. Conventionally, there has been a desire to visualize blood vessels based on volume data of a subject eye.

SUMMARY OF THE INVENTION

A first aspect is an image processing method performed by a processor, the image processing method including: a step of acquiring OCT volume data including a choroid; a step of generating plural en-face images corresponding to plural planes having different depths, based on the OCT volume data; a step of deriving an image feature amount in each of the plural en-face images; and a step of identifying, as a boundary, an interval between en-face images in which the image feature amounts indicate a switch between presence and absence of choroidal blood vessels, based on the respective image feature amounts.

A second aspect is an image processing device, including a processor, the processor executing: a step of acquiring OCT volume data including a choroid; a step of generating plural en-face images corresponding to plural planes having different depths, based on the OCT volume data; a step of deriving an image feature amount in each of the plural en-face images; and a step of identifying, as a boundary, an interval between en-face images in which the image feature amounts indicate a switch between presence and absence of choroidal blood vessels, based on the respective image feature amounts.

A third aspect is a program for performing image processing, the program causing a processor to execute: a step of acquiring OCT volume data including a choroid; a step of generating plural en-face images corresponding to plural planes having different depths, based on the OCT volume data; a step of deriving an image feature amount in each of the plural en-face images; and a step of identifying, as a boundary, an interval between en-face images in which the image feature amounts indicate a switch between presence and absence of choroidal blood vessels, based on the respective image feature amounts.

BEST MODE FOR CARRYING OUT THE INVENTION

Hereinafter, an ophthalmic system 100 according to an embodiment of the present disclosure is described with reference to the drawings.

Figure 1:
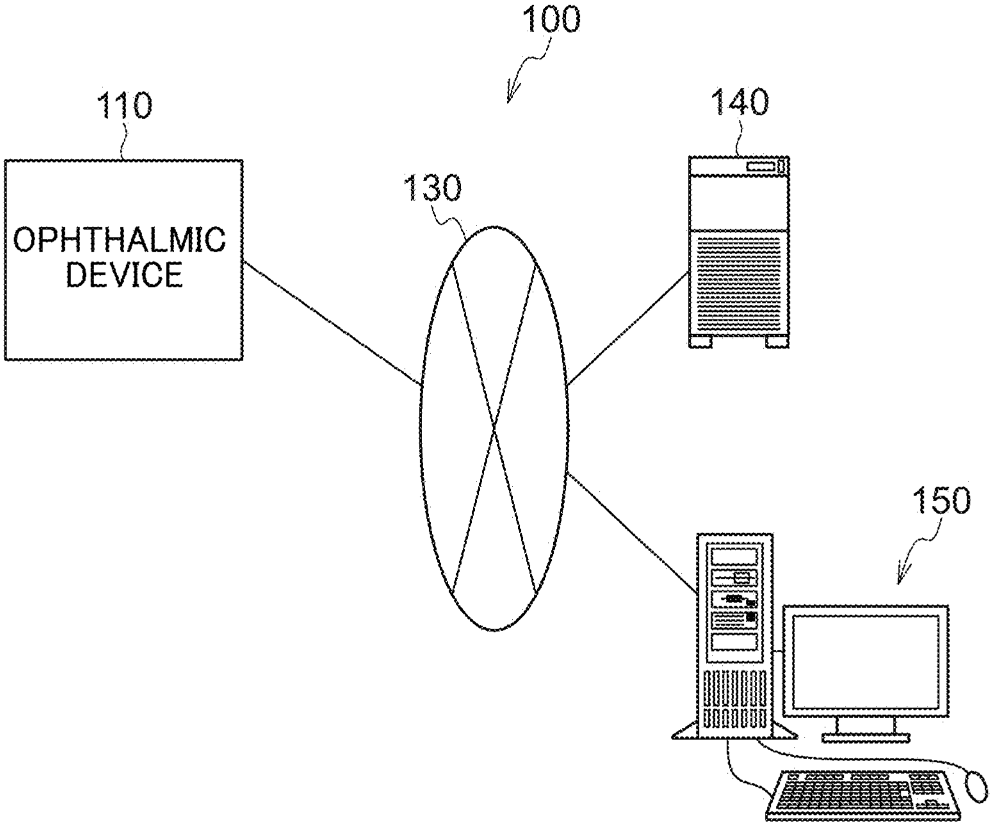
FIG. 1 is a schematic configuration diagram of an ophthalmic system according to an embodiment.

FIG. 1 shows a schematic configuration of an ophthalmic system 100. As shown in FIG. 1, an ophthalmic system 100 includes an ophthalmic device 110, a server device (hereinafter, referred to as a "server") 140, and a display device (hereinafter referred to as a "viewer") 150. The ophthalmic device 110 acquires a fundus image. The server 140 stores plural fundus images obtained by capturing an image of the fundus of plural patients using the ophthalmic device 110, and an axial length measured by an ocular axial length measurement device (not shown), in association with a patient ID. The viewer 150 displays the fundus images acquired by the server 140 and analysis results.

The server 140 is an example of the "image processing device" of the present disclosure.

The ophthalmic device 110, the server 140, and the viewer 150 are connected to each other via a network 130. The network 130 may be any network such as a LAN, a WAN, the Internet, or a wide area Ethernet network. For example, when the ophthalmic system 100 is constructed in a single hospital, a LAN can be adopted as the network 130.

The viewer 150 is a client in a client-server system, and plural viewers are connected via a network. Further, in order to ensure redundancy in the system, plural servers 140 may be connected via a network. Alternatively, if the ophthalmic device 110 is provided with an image processing function and an image viewing function of the viewer 150, the ophthalmic device 110 is capable of acquisition of fundus images, image processing, and image viewing in a stand-alone state. Further, if the server 140 is provided with an image viewing function of the viewer 150, the configuration of the ophthalmic device 110 and the server 140 enables acquisition of fundus images, image processing, and image viewing.

In addition, other ophthalmic devices (examination devices for visual field measurement, intraocular pressure measurement, and the like) and diagnostic support devices that perform image analysis using artificial intelligence (AI) may be connected to the ophthalmic device 110, the server 140, and the viewer 150 via the network 130.

Next, the configuration of the ophthalmic device 110 is described with reference to FIG. 2.

For convenience of explanation, a scanning laser ophthalmoscope is referred to as an "SLO". In addition, optical coherence tomography is referred to as "OCT".

In a case in which the ophthalmic device 110 is placed on a horizontal plane, the horizontal direction is referred to as the "X direction", the vertical direction relative to the horizontal plane is referred to as the "Y direction", and the direction connecting the center of the pupil of the anterior part of the subject eye 12 and the center of the eyeball is referred to as the "Z direction". Thus, the X, Y and Z directions are perpendicular to each other.

The ophthalmic device 110 includes an imaging device 14 and a control device 16. The imaging device 14 is provided with an SLO unit 18 and an OCT unit 20, and obtains a fundus image of the subject eye 12. In the following, the two-dimensional fundus image acquired by the SLO unit 18 is referred to as an SLO image. Further, a tomographic image, an en-face image or the like of the retina created based on OCT data acquired by the OCT unit 20 is referred to as an OCT image.

A control device 16 is provided with a computer having a central processing unit (CPU) 16A, a random access memory (RAM) 16B, a read-only memory (ROM) 16C, and an input/output (I/O) port 16D.

The control device 16 includes an input/display device 16E connected to the CPU 16A via the I/O port 16D. The input/display device 16E has a graphic user interface that displays an image of the subject eye 12 and receives various instructions from a user. Examples of the graphic user interface include a touch panel display.

Further, the control device 16 includes an image processor 17 connected to the I/O port 16D. The image processor 17 generates an image of the subject eye 12 based on data obtained by the imaging device 14. The control device 16 is connected to the network 130 via a communication interface (I/F) 16F.

As described above, in FIG. 2, the control device 16 of the ophthalmic device 110 is provided with an input/display device 16E; however, the present disclosure is not limited in this respect. For example, the control device 16 of the ophthalmic device 110 does not need to include the input/display device 16E, and a separate input/display device that is physically independent from the ophthalmic device 110 may be provided. In this case, the display device is provided with an image processing unit that operates under the control of a display control unit 204 of the CPU 16A of the control device 16. The image processing unit may display an SLO image or the like based on an image signal that the display control unit 204 has instructed to be output.

The imaging device 14 operates under the control of the CPU 16A of the control device 16. The imaging device 14 includes the SLO unit 18, an imaging optical system 19, and the OCT unit 20. The imaging optical system 19 includes an optical scanner 22 and a wide-angle optical system 30.

The optical scanner 22 performs two-dimensional scanning in the X and Y directions with light emitted from the SLO unit 18. The optical scanner 22 may be an optical element capable of deflecting a light beam, and, for example, a polygon mirror or a galvanometer mirror may be used. It may also be a combination of these.

The wide-angle optical system 30 combines the light from the SLO unit 18 and light from the OCT unit 20.

The wide-angle optical system 30 may be a reflective optical system using a concave mirror such as an elliptical mirror, a refractive optical system using a wide-angle lens or the like, or a catadioptric optical system combining a concave mirror and a lens. By using a wide-angle optical system that uses an elliptical mirror, a wide-angle lens, or the like, it is possible to image the retina not only at the central part of the fundus but also at the peripheral part of the fundus.

When using a system including an elliptical mirror, the configuration may use the system using an elliptical mirror described in International Publication (WO) No. 2016/103484 or International Publication (WO) No. 2016/103489. The disclosures of International Publication (WO) No. 2016/103484 and International Publication (WO) No. 2016/103489 are each incorporated herein by reference in their entirety.

The wide-angle optical system 30 realizes observation of the fundus with a wide field of view (FOV) 12A. The FOV 12A indicates the range that can be imaged by the imaging device 14. The FOV 12A can be expressed as a field of view angle. In the present embodiment, the viewing angle can be defined by an internal illumination angle and an external illumination angle. The external illumination angle is the illumination angle of the light beam from the ophthalmic device 110 that illuminates the subject eye 12, as defined with the pupil 27 as a reference. Further, the internal illumination angle is the illumination angle of the light beam that illuminates the fundus, as defined with the center O of the eyeball as a reference. The external illumination angle and the internal illumination angle correlate with each other. For example, in a case in which the external illumination angle is 120 degrees, the internal illumination angle corresponds to approximately 160 degrees. In the present embodiment, the internal illumination angle is set at 200 degrees.

Here, an SLO fundus image captured at an internal illumination angle of 160 degrees or more is referred to as a UWF-SLO fundus image. Further, UWF is an abbreviation for UltraWide Field. By the wide-angle optical system 30 having an ultra-wide field angle as the field of view (FOV) angle of the fundus, an area extending from the posterior pole of the fundus of the subject eye 12 beyond the equator can be imaged, and structures present around the fundus, such as vortex veins, can be imaged.

The ophthalmic device 110 can capture an image of an area 12A with an internal illumination angle of 200°, with the eyeball center O of the subject eye 12 as a reference position. The internal illumination angle of 200° corresponds to an external illumination angle of 110° based on the pupil of the eyeball of the subject eye 12. That is, the wide-angle optical system 30 irradiates laser light from the pupil at a field angle with an external illumination angle of 110°, and captures an image of the fundus region at an internal illumination angle of 200°.

Figure 2:
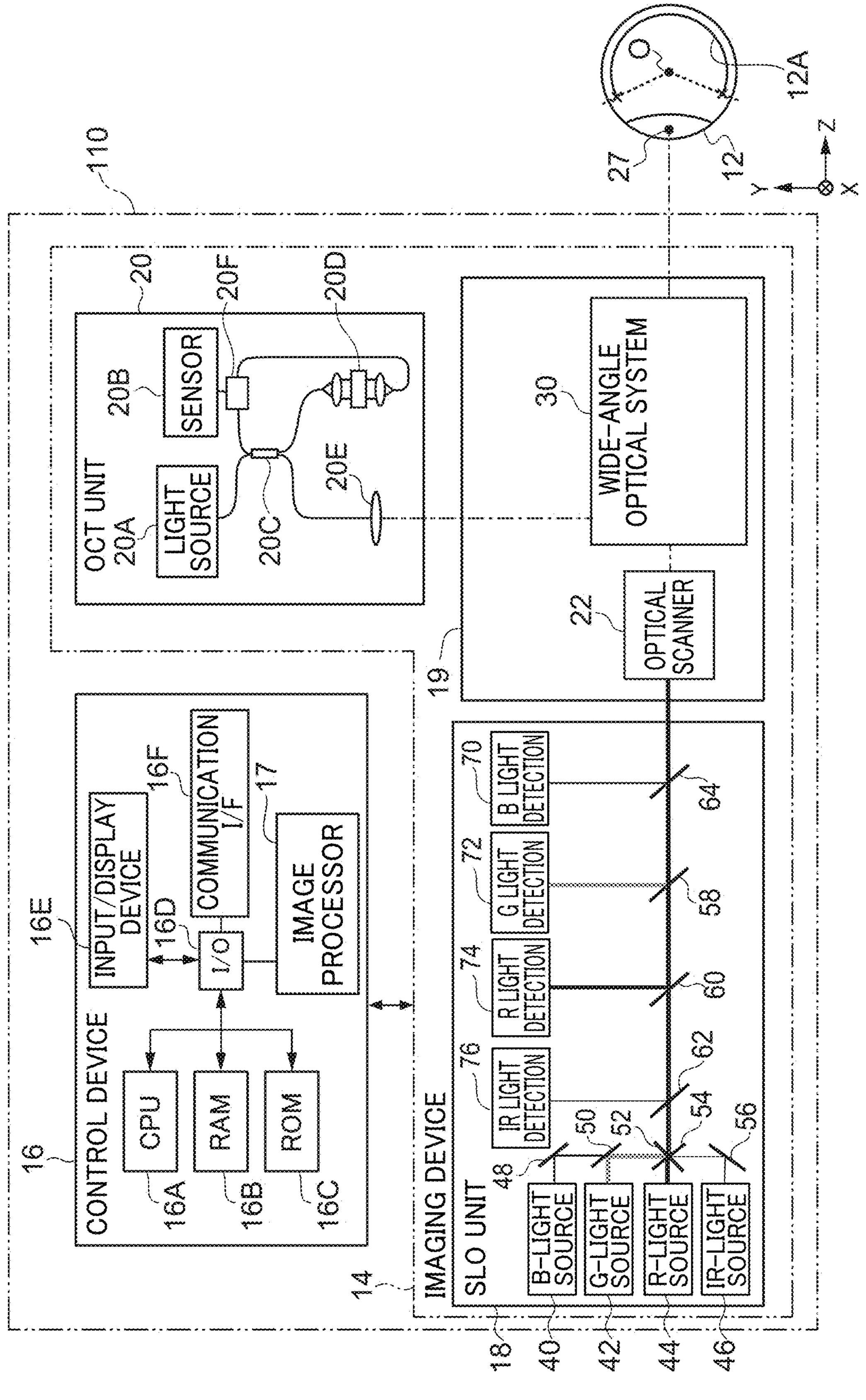
FIG. 2 is a schematic configuration diagram of an ophthalmic device according to an embodiment.

The SLO system is realized by the control device 16, the SLO unit 18, and the imaging optical system 19 shown in FIG. 2. The SLO system includes a wide-angle optical system 30, which enables fundus imaging with a wide FOV 12A.

The SLO unit 18 is provided with a light source 40 of B light (blue light), a light source 42 of G light (green light), a light source 44 of R light (red light), a light source 46 of IR light (infrared (for example, near infrared) light), and optical systems 48, 50, 52, 54, 56 that reflect or transmit light from the light sources 40, 42, 44, 46 and guide it to one optical path. The optical systems 48, 56 are mirrors, and the optical systems 50, 52, 54 are beam splitters. The B light is reflected by the optical system 48, transmits through the optical system 50, and is reflected by the optical system 54; the G light is reflected by the optical systems 50, 54; the R light transmits through the optical systems 52, 54; and the IR light is reflected by the optical systems 52, 56, and each are directed along one optical path.

The SLO unit 18 is configured to be able to switch between a light source that emits laser light of different wavelengths, such as a mode that emits R light and G light, or a mode that emits infrared light, and a combination of light sources that emit light. In the example shown in FIG. 2, four light sources are provided: a B light source 40, a G light source 42, an R light source 44, and an IR light source 46; however, the present disclosure is not limited in this respect. For example, the SLO unit 18 may further include a light source for white light and emit light in various modes, such as a mode for emitting G light, R light, and B light, or a mode for emitting only white light.

The light incident on the imaging optical system 19 from the SLO unit 18 is scanned in the X and Y directions by the optical scanner 22. The scanning light passes through the wide-angle optical system 30 and the pupil 27 and is irradiated onto the fundus. The light reflected by the fundus passes through the wide-angle optical system 30 and the optical scanner 22 and enters the SLO unit 18.

The SLO unit 18 is provided with a beam splitter 64 that, of light from the posterior eye segment (fundus) of the subject eye 12, reflects B light and transmits light other than the B light, and a beam splitter 58 that, of the light transmitted through the beam splitter 64, reflects G light and transmits light other than the G light. The SLO unit 18 is provided with a beam splitter 60 that, of the light transmitted through the beam splitter 58, reflects R light and transmits light other than the R light. The SLO unit 18 includes a beam splitter 62 that, of the light transmitted through the beam splitter 60, reflects IR light. The SLO unit 18 is provided with a B light detection element 70 that detects the B light reflected by the beam splitter 64, a G light detection element 72 that detects the G light reflected by the beam splitter 58, an R light detection element 74 that detects the R light reflected by the beam splitter 60, and an IR light detection element 76 that detects the IR light reflected by the beam splitter 62.

The light (light reflected by the fundus) that is incident on the SLO unit 18 via the wide-angle optical system 30 and the optical scanner 22 is reflected by the beam splitter 64 and received by the B light detection element 70 in the case of B light, and is reflected by the beam splitter 58 and received by the G light detection element 72 in the case of G light. In the case of R light, the above-described incident light transmits through the beam splitter 58, is reflected by the beam splitter 60, and is received by the R light detection element 74. In the case of IR light, the above-described incident light transmits through the beam splitters 58, 60, is reflected by the beam splitter 62, and is received by the IR light detection element 76. The image processor 17, which operates under the control of the CPU 16A, generates UWF-SLO images using signals detected by the B light detection element 70, the G light detection element 72, the R light detection element 74, and the IR light detection element 76.

A UWF-SLO image generated using the signal detected by the B light detection element 70 is called a B-UWF-SLO image (B-color fundus image). A UWF-SLO image generated using the signal detected by the G light detection element 72 is called a G-UWF-SLO image (G-color fundus image). A UWF-SLO image generated using the signal detected by the R light detection element 74 is called an R-UWF-SLO image (R-color fundus image). A UWF-SLO image generated using the signal detected by the IR light detection element 76 is called an IR-UWF-SLO image (IR fundus image). The UWF-SLO images include the R-color fundus image, the G-color fundus image, the B-color fundus image, and the IR fundus image. Further, a fluorescent UWF-SLO image captured by imaging fluorescence is included.

The control device 16 also controls the light sources 40, 42, 44 so as to emit light simultaneously. By simultaneously imaging the fundus of the subject eye 12 with the B light, the G light, and the R light, a G-color fundus image, an R-color fundus image, and a B-color fundus image, respectively having mutually corresponding positions, are obtained. An RGB color fundus image is obtained from the G-color fundus image, the R-color fundus image, and the B-color fundus image. The control device 16 controls the light sources 42, 44 so as to emit light, and by simultaneously imaging the fundus of the subject eye 12 with the the G light, and the R light, a G-color fundus image, and an R-color fundus image, respectively having mutually corresponding positions, are obtained. An RG color fundus image is obtained from the G-color fundus image and R-color fundus image. Further, a full-color fundus image may be generated using the the G-color fundus image, the R-color fundus image, and the B-color fundus image.

The wide-angle optical system 30 makes the field of view (FOV) of the fundus an ultra-wide field angle, making it possible to image the area from the posterior pole of the fundus of the subject eye 12 to beyond the equator.

The OCT system is realized by the control device 16, the OCT unit 20, and the imaging optical system 19 shown in FIG. 2. The OCT system includes a wide-angle optical system 30, and thus enables OCT imaging of a peripheral portion of the fundus, similarly to the above-described capture of the SLO fundus image. That is, by the wide-angle optical system 30 having an ultra-wide field angle as the field of view (FOV) angle of the fundus, OCT imaging of an area extending from the posterior pole of the fundus of the subject eye 12 to beyond the equator 178 can be performed. It is possible to obtain OCT data of structures present around the fundus, such as vortex veins, and it is possible to obtain tomographic images of the vortex veins, and the 3D structure of the vortex veins by image processing the OCT data.

The OCT unit 20 includes a light source 20A, a sensor (detection element) 20B, a first optical coupler 20C, a reference optical system 20D, a collimating lens 20E, and a second optical coupler 20F.

The light emitted from the light source 20A is branched by the first optical coupler 20C. One of the branched beams is collimated by the collimator lens 20E and then made incident on the imaging optical system 19 as measurement light. The measurement light passes through the wide-angle optical system 30 and the pupil 27 and is irradiated onto the fundus. The measurement light reflected by the fundus is incident on the OCT unit 20 via the wide-angle optical system 30, and is incident on the second optical coupler 20F via the collimator lens 20E and the first optical coupler 20C.

The remaining light emitted from the light source 20A and branched by the first optical coupler 20C is incident on the reference optical system 20D as reference light, and is incident on the second optical coupler 20F via the reference optical system 20D.

These lights incident on the second optical coupler 20F—that is, the measurement light reflected at the fundus and the reference light—are interfered with by the second optical coupler 20F to generate interference light. The interference light is received by sensor 20B. The image processor 17, operating under the control of the image processing unit 206, generates OCT data detected by the sensor 20B. It is also possible for the image processor 17 to generate OCT images, such as tomographic images and en-face images, based on the OCT data.

Here, the OCT unit 20 can scan a predetermined range (for example, an equiangular quadrilateral range of 6 mm×6 mm) in one instance of OCT imaging. The predetermined range is not limited to 6 mm×6 mm, and may be a square range of 12 mm×12 mm or 23 mm×23 mm, may be a rectangular range of 14 mm×9 mm, 6 mm×3.5 mm or the like, or can be any equiangular quadrilateral range. Further, a circular range having a diameter of 6 mm, 12 mm, 23 mm, or the like is also possible.

By using the wide-angle optical system 30, the ophthalmic device 110 can scan the area 12A with an internal illumination angle of 200°. That is, by controlling the optical scanner 22, OCT imaging of a predetermined range including a vortex vein is performed. The ophthalmic device 110 is able to generate OCT data by this OCT imaging.

Thus, the ophthalmic device 110 can generate a tomographic image (B-scan image) of the fundus including the vortex vein, which is an OCT image, OCT volume data including vortex veins, and an en-face image which is a cross section of the OCT volume data (a front-face image generated based on the OCT volume data). Needless to say, the OCT image includes an OCT image of the central part of the fundus (the posterior pole of the eyeball at which the macula, optic disk, and the like are present).

The OCT data (or image data of the OCT image) is sent from the ophthalmic device 110 to the server 140 via the communication interface 16F and is stored in a storage device 254.

In the present embodiment, a wavelength-swept type SS-OCT (Swept-Source OCT) is exemplified as the light source 20A; however, the OCT system may be of various types, such as SD-OCT (Spectral-Domain OCT) or TD-OCT (Time-Domain OCT).

Figure 3:
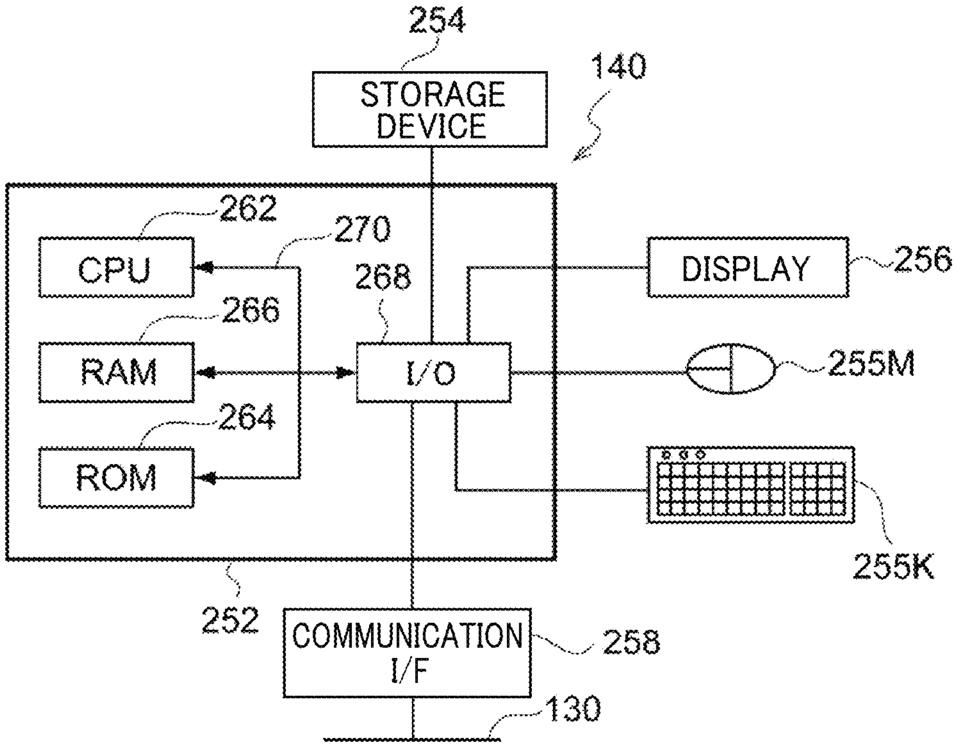
FIG. 3 is a schematic configuration diagram of a server.

Next, the configuration of the electrical system of the server 140 is described with reference to FIG. 3. As shown in FIG. 3, the server 140 includes a computer main unit 252. The computer main unit 252 includes a CPU 262, a RAM 266, a ROM 264, and an input/output (I/O) port 268. The input/output (I/O) port 268 is connected to the storage device 254, a display 256, a mouse 255M, a keyboard 255K, and a communication interface (I/F) 258. The storage device 254 is configured by a non-volatile memory, for example. The input/output (I/O) port 268 is connected to the network 130 via the communication interface (I/F) 258. Accordingly, the server 140 can communicate with the ophthalmic device 110 and the viewer 150.

The ROM 264 or the storage device 254 stores an image processing program.

The ROM 264 or the storage device 254 is an example of the "memory" of the present disclosure. The CPU 262 is an example of the "processor" of the present disclosure. The image processing program is an example of the "program" of the present disclosure.

The server 140 stores respective data received from the ophthalmic device 110 in the storage device 254.

Figure 4:
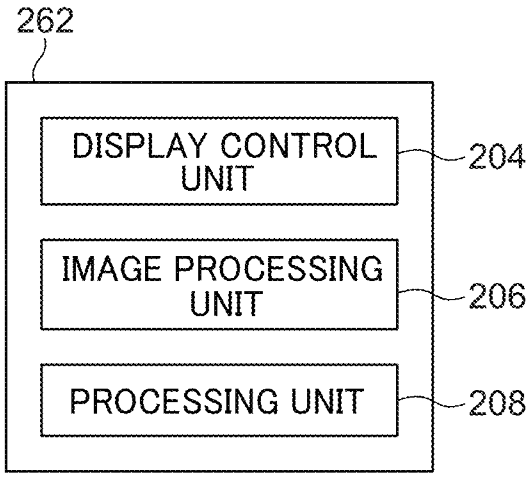
FIG. 4 is an explanatory diagram of functions realized by an image processing program in a CPU of a server.

Various functions realized by the CPU 262 of the server 140 executing the image processing program are described. As shown in FIG. 4, the image processing program executed by the CPU 262 has a display control function, an image processing function, and a processing function. The CPU 262 executes the image processing program having these functions, whereby the CPU 262 functions as a display control unit 204, an image processing unit 206, and a processing unit 208.

Next, a main flowchart of image processing by the server 140 is described with reference to FIG. 5. The CPU 262 of the server 140 executes the image processing program to realize the image processing (image processing method) shown in FIG. 5.

First, in step S10, the image processing unit 206 acquires the fundus image from the storage device 254. The fundus image includes data related to the vortex vein that is to be displayed stereoscopically, based on a user's instruction.

Next, in step S20, the image processing unit 206 acquires OCT volume data including the choroid corresponding to the fundus image from the storage device 254.

When the OCT volume data is acquired, the image processing unit 206 executes blood vessel component presence/absence boundary acquisition processing (described in detail below) in step S22 to acquire a boundary indicating the presence/absence of choroidal blood vessels.

In the next step S30, the image processing unit 206 extracts choroidal blood vessels based on the OCT volume data, and executes image formation processing for the choroidal blood vessels (described in detail below) to generate a stereoscopic image (3D image) of the vortex vein blood vessels.

When a stereoscopic image (3D image) of the vortex vein blood vessels is generated, in step S40, the processing unit 208 outputs the generated stereoscopic image (3D image) of the vortex vein blood vessels; specifically, stores the image in the RAM 266 or the storage device 254, and ends the image processing.

Figure 17:
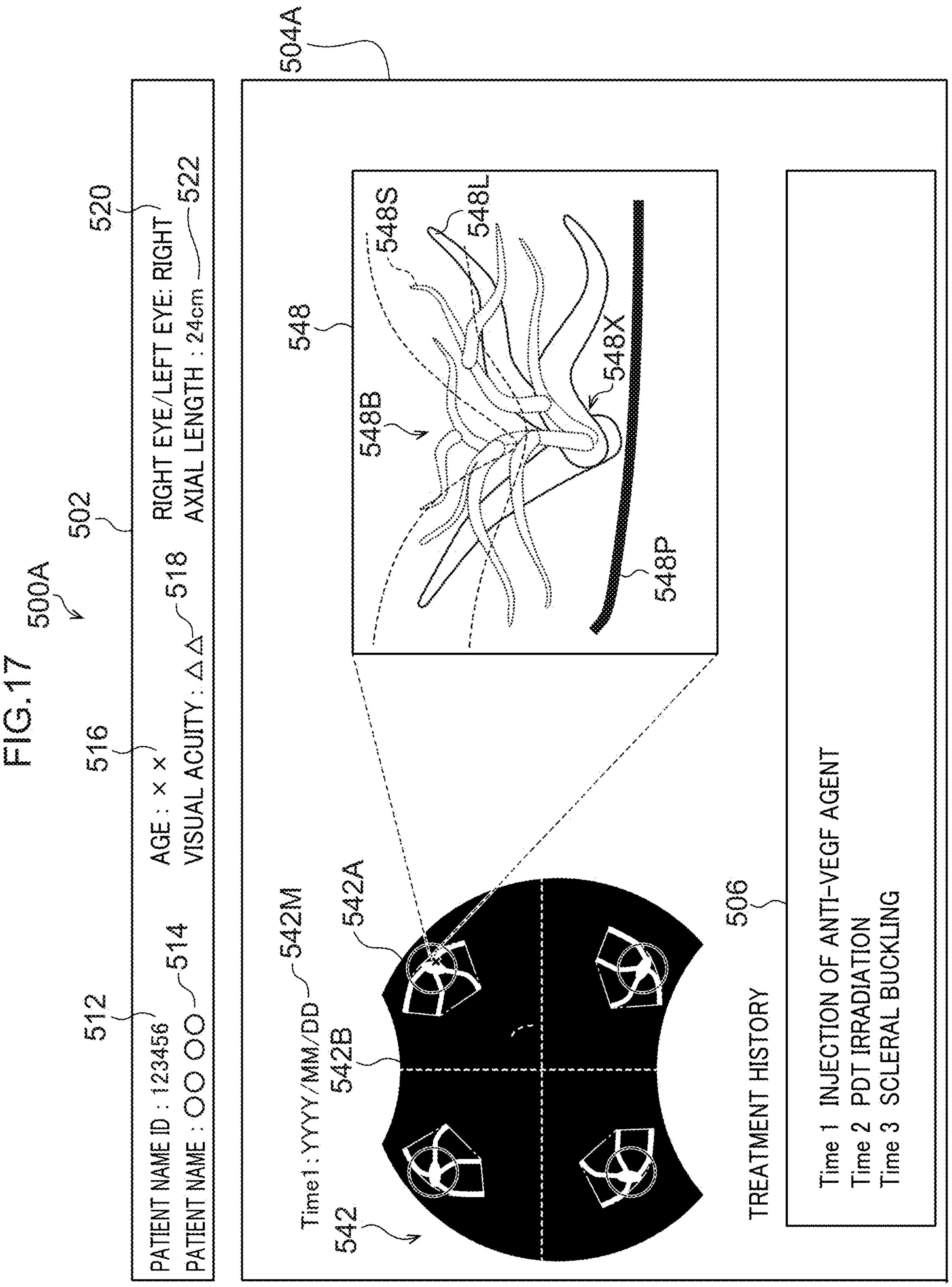
FIG. 17 is a diagram showing an example of a display screen using a stereoscopic image of vortex veins.

Here, a display screen including a stereoscopic image of the vortex veins (an example of the display screen is shown in FIG. 17, which is described below) is generated by the display control unit 204 based on a user instruction. The generated display screen is output to the viewer 150 as an image signal by the processing unit 208. The display screen is displayed at the display of the viewer 150.

Here, the positional relationship between the choroid 12M and the vortex veins 12V1, V2 in the eyeball is described with reference to FIG. 12.

Figure 12:
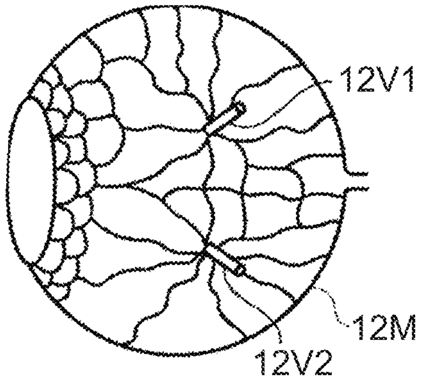
FIG. 12 is a schematic diagram showing the relationship between the eyeball and the positions of vortex veins.

In FIG. 12, the mesh-like pattern indicates choroidal blood vessels of the choroid 12M. The choroidal vessels supply blood to the entire choroid. Further, blood flows out from the eyeball through a plurality of (usually four to six) vortex veins present in the subject eye 12. FIG. 12 shows a superior vortex vein 12V1 and an inferior vortex vein 12V2 present on one side of the eyeball. Vortex veins are often found near the equator region. Therefore, in order to image the vortex veins present in the subject eye 12 and the choroidal blood vessels around the vortex veins, an ophthalmic device 110 capable of scanning with an internal illumination angle of, for example, 200° is used.

First, the image processing unit 206 acquires a fundus image (step S10) and identifies a vortex vein (VV) that is to be displayed stereoscopically. Here, as an example, a UWF-SLO image is acquired from the storage device 254 as a UWF fundus image. Next, the image processing unit 206 creates a choroidal blood vessel image, which is a binarized image, from the acquired UWF-SLO image. Further, an area designated by the user is specified as the vortex vein to be displayed stereoscopically.

Figure 14:
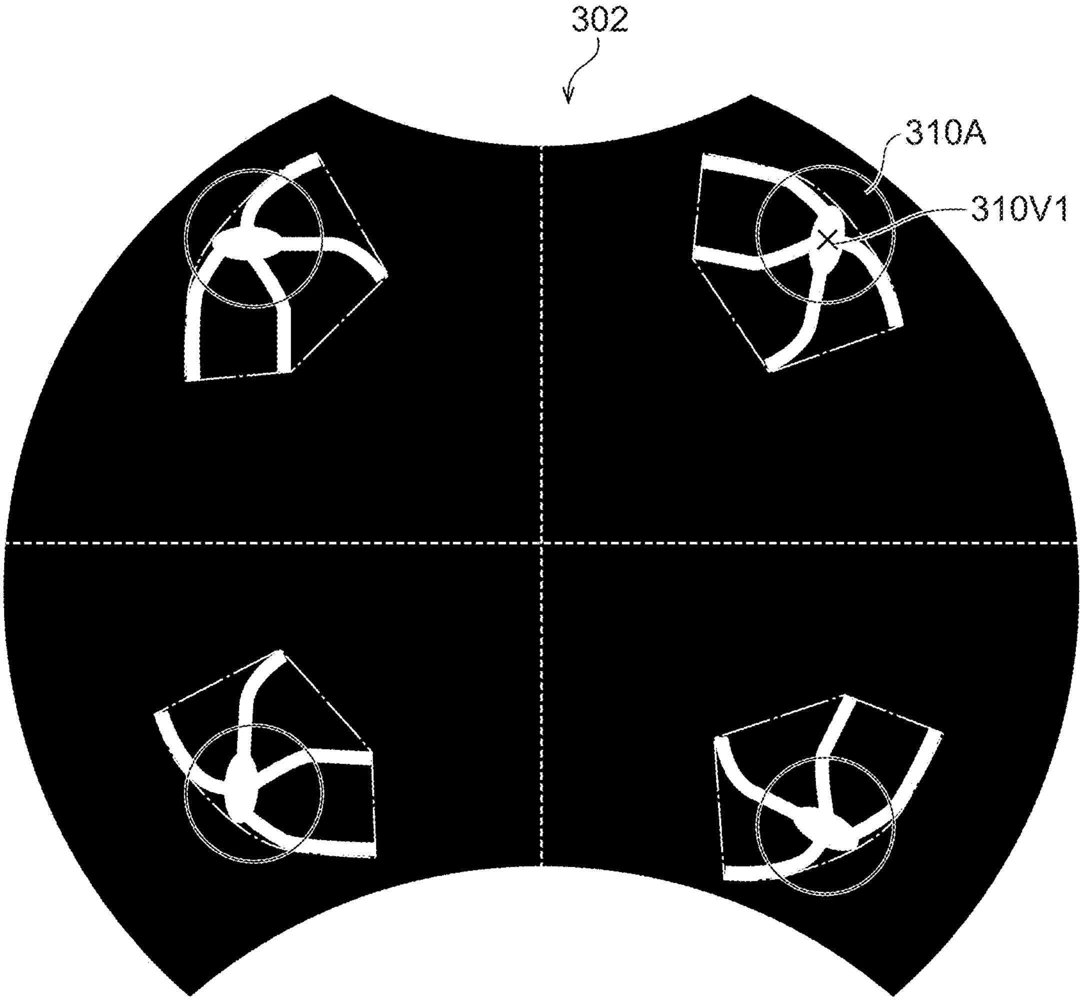
FIG. 14 is a diagram showing an example of a fundus image of choroidal blood vessels including vortex veins.

FIG. 14 is a fundus image of choroidal blood vessels including vortex veins. The fundus image shown in FIG. 14 is an example of a choroidal blood vessel image, which is a binarized image created from a UWF-SLO image. As shown in FIG. 14, the choroidal blood vessel image is a binarized image in which pixels corresponding to choroidal blood vessels and vortex veins are colored white and pixels in other regions are colored black.

FIG. 14 is an image 302 showing the presence of choroidal blood vessels connected to vortex veins. Image 302 shows a case in which a vortex vein 310V1, which is an image of an upper vortex vein 12V1 included in a user-specified area 310A, has been identified as the vortex vein (VV) to be stereoscopically displayed, and areas containing choroidal blood vessels have been identified.

A choroidal blood vessel image including the vortex vein (VV) is generated by image processing performed on the image data of an R-UWF-SLO image (red color fundus image) imaged with red light (laser light with a wavelength of 630 to 660 nm) and a G-UWF-SLO image (green fundus image) imaged with green light (laser light with a wavelength of 500 to 550 nm). Specifically, a choroidal blood vessel image is generated by extracting retinal blood vessels from the G fundus image, removing the retinal blood vessels from the R fundus image, and performing image processing to enhance the choroidal blood vessels. With respect to a method for generating a choroidal blood vessel image, the disclosure of International Publication (WO) No. 2019/181981 is incorporated herein by reference in its entirety.

In the foregoing, it is explained that the vortex vein to be displayed stereoscopically is specified in response to a user instruction; however, the present disclosure is not limited in this respect. The positions of the vortex veins to be displayed stereoscopically may be detected manually or automatically. For example, in the case of manual detection, the position instructed based on the user's visual inspection of the displayed choroidal blood vessels may be detected. In the case of automatic detection, choroidal blood vessels are extracted from a choroidal blood vessel image, for example, the movement direction (blood vessel travel direction) of each choroidal blood vessel is estimated, and the position of the vortex vein can be estimated based on the position at which the choroidal blood vessels converge.

Incidentally, in a case of performing image formation of choroidal blood vessels, there are cases in which it is required to respectively extract choroidal blood vessels having a diameter that is larger than a predetermined value (hereinafter, referred to as thick blood vessels) and choroidal blood vessels having a diameter that is lower than a predetermined value (hereinafter, referred to as thin blood vessels). Since thin blood vessels have lower image contrast than thick blood vessels, if the same image processing is applied to both thick and thin blood vessels, it is difficult to extract the thin blood vessels as continuous line structures. For this reason, it is conceivable to extract thick blood vessels and thin blood vessels by performing separate image processing. The processing for extracting these thick blood vessels and thin blood vessels by separate image processing is described in detail below. However, in the processing for extracting thin blood vessels, there is a risk that images of noise will be extracted as thin blood vessels, and blood vessels may be determined to exist even in areas in which no blood vessels exist. This reduces the positional accuracy of the boundary between the presence and absence of blood vessel components (for example, the sclera).

Figure 13:
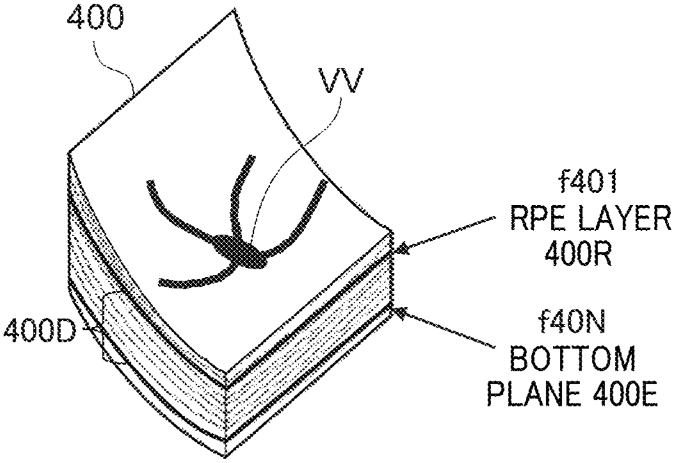
FIG. 13 is a diagram showing the relationship between OCT volume data and an en-face image.

As shown in FIG. 13, the OCT volume data 400 is OCT volume data 400 of a predetermined area including the vortex vein VV—for example an equiangular quadrilateral area of 6 mm×6 mm—obtained by OCT imaging of one of the plural vortex veins VV present in the subject eye using the ophthalmic device 110. N planes having different depths are set for the OCT volume data 400, from a first plane f401 to an N-th plane f40N. The OCT volume data 400 may be obtained by OCT imaging of each of the plural vortex veins VV present in the subject eye using the ophthalmic device 110.

In the present embodiment, an example of OCT volume data 400D, which includes a vortex vein and choroidal blood vessels around the vortex vein, is explained. In this case, the choroidal blood vessels refer to the vortex vein and the choroidal blood vessels surrounding the vortex vein.

Figure 6:
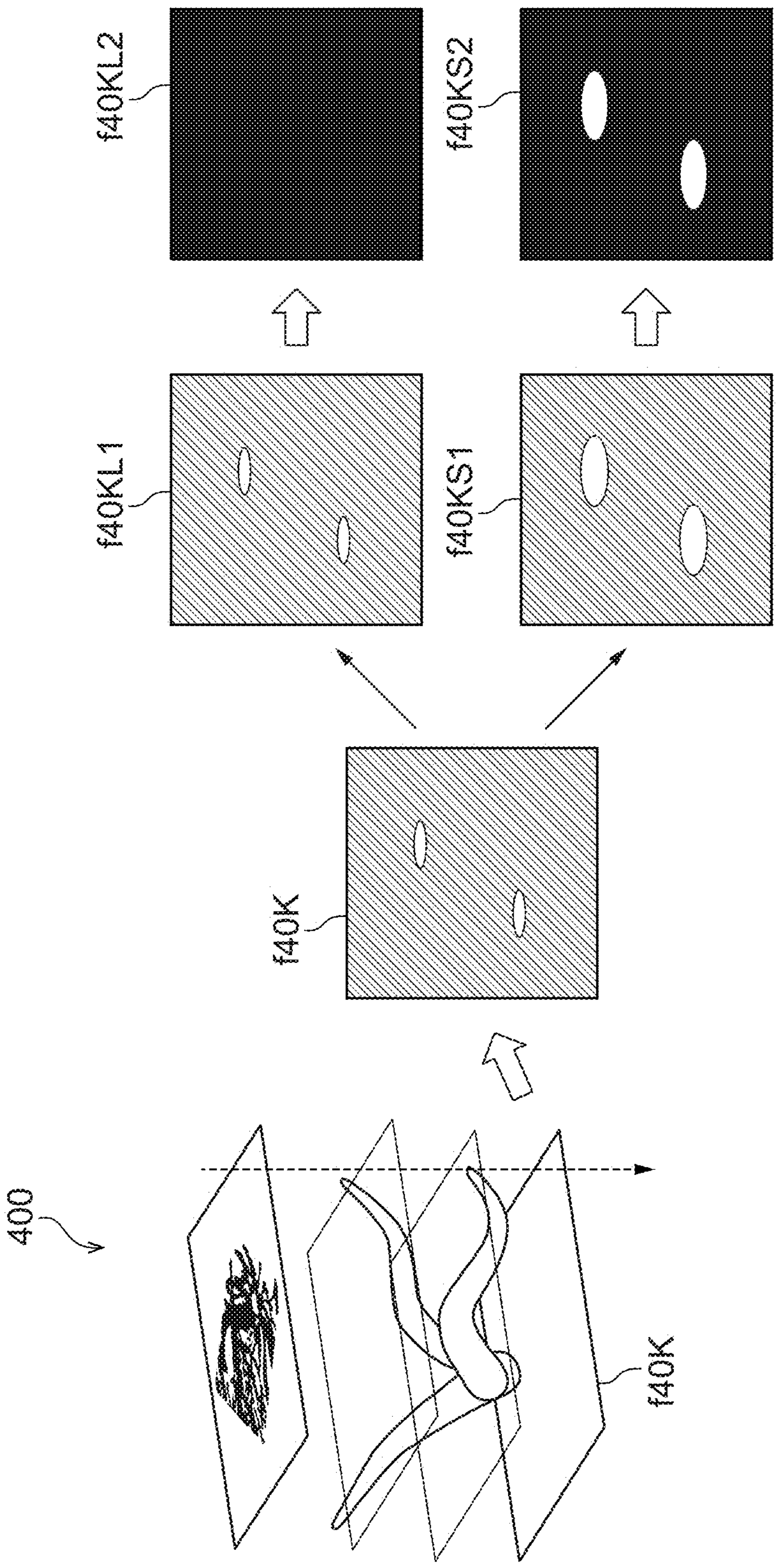
FIG. 6 is an explanatory diagram related to image processing performed with respect to an image.

FIG. 6 shows an example of a case in which image processing is performed on an image of choroidal blood vessels. In FIG. 6, with respect to an en-face image of an area where no blood vessels exist, the results of a case of performing image processing on thick blood vessels and image processing on thin blood vessels are shown as an image of choroidal blood vessels.

As shown in FIG. 6, in a case in which an image of a noise component exists in an en-face image f40K of a region in which blood vessels do not exist, processing for extracting thick blood vessels is performed (image f40KL1), and then a binarization process is performed to obtain an image f40KL2, from which noise components have been removed. However, noise components remain in the image f40KS2, which has been subjected to processing to extract thin blood vessels (image f40KS1) and then binarized. Accordingly, when implementing the processing for extracting thin blood vessels, there are cases in which images of noise will be extracted as thin blood vessels, and blood vessels may be determined to exist even in areas in which no blood vessels exist.

An image containing blood vessel components differs in terms of image feature amount from an image containing residual noise components. Examples of image feature amounts that can be applied include standard deviation of image brightness, a change trend of the standard deviation, and entropy of image brightness. For the standard deviation of image brightness, the standard deviation of the brightness of each of the en-face images can be used. In addition, for the change trend of the standard deviation, it is possible to use a feature value indicated by a differential value of a characteristic curve of the standard deviation of plural en-face images. For the entropy related to the brightness of an image, a physical quantity related to the sum of the brightnesses of pixels in an en-face image can be used as a feature quantity. In the present embodiment, a case is described in which the standard deviation of image brightness is used as the image feature amount.

Figure 7:
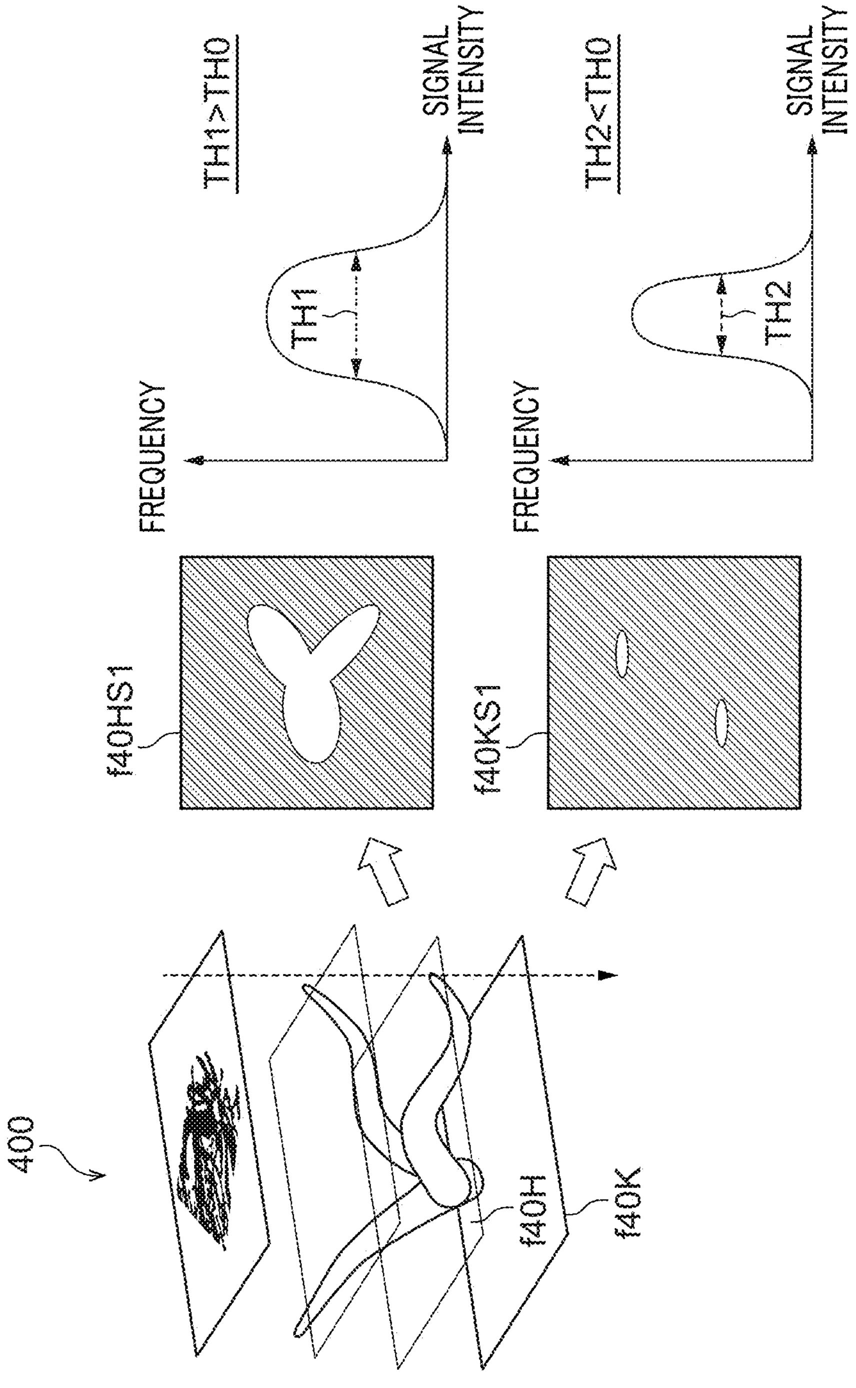
FIG. 7 is an explanatory diagram of image feature quantities that change depending on the presence or absence of blood vessel components.

FIG. 7 shows an explanatory diagram of an example of an image feature amount (here, standard deviation) that changes depending on the presence or absence of a blood vessel component. An example of a case in which image processing is performed on an image of choroidal blood vessels is shown.

First, the standard deviation is examined for an image f40HS1 obtained by subjecting an en-face image f40H of a region in which blood vessels exist (blood vessel components are present) to image processing as an image of choroidal blood vessels. The standard deviation value in the image f40HS1 corresponds to the distribution width TH1 in the characteristics of signal intensity and frequency. The signal intensity indicates a physical quantity that indicates the brightness of the image in the image f40HS1, and the frequency indicates the frequency with which the physical quantity appears in the image f40HS1. Similarly, in an image f40KS1 obtained by performing image processing on an en face image f40K of a region in which no blood vessels exist (blood vessel components are not present), the standard deviation value corresponds to the distribution width TH2. In terms of width, with respect to a width TH1 indicating the standard deviation value of an en-face image f40H with a blood vessel component, in an en-face image f40KS1 without a blood vessel component, the width TH2 (<TH1) indicates a standard deviation value smaller than the width TH1. This means that the standard deviation value tends to become smaller as the number of blood vessel components decreases. Therefore, by predetermining a boundary determination value indicating the presence or absence of blood vessels—that is, a transition between the presence or absence of blood vessel components—it becomes possible to determine the boundary between the presence or absence of blood vessel components. The boundary determination value determines a standard deviation value according to a width TH0(TH2≤TH0<TH1) that is smaller than width TH1 and larger than or equal to width TH2. Therefore, an en-face image of a plane (layer) having a standard deviation value larger than the standard deviation value indicated by the width TH0 can be determined to have a blood vessel component, and an en-face image of a plane (layer) having a standard deviation value smaller than or equal to the standard deviation value indicated by the width TH0 can be determined to have no blood vessel components.

The above-described boundary determination value can be derived in advance.

Figure 8:
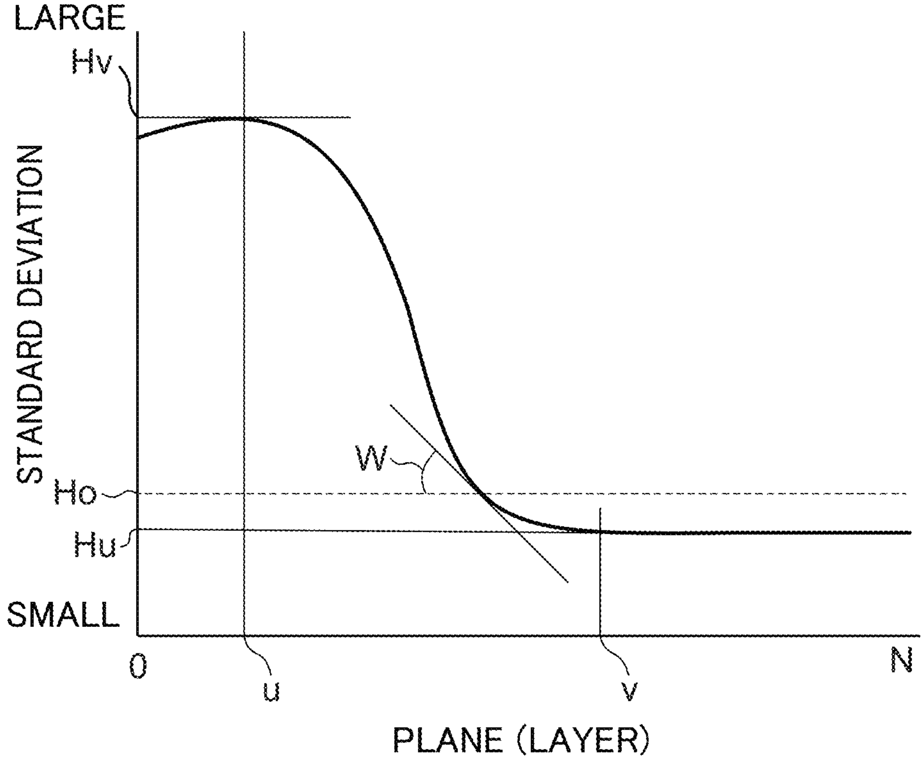
FIG. 8 is a diagram showing the characteristics of standard deviation with respect to plural en-face images in OCT volume data.

FIG. 8 shows the characteristics of standard deviation with respect to plural en-face images in the OCT volume data 400. As shown in FIG. 8, from the first plane f401 to the N-th plane f40N, the standard deviation characteristic reaches a maximum value Hu at the u-th plane then gradually decreases, and converges to a minimum value Hv at the v-th plane. Therefore, a standard deviation value that is smaller than the maximum value Hu and equal to or greater than the minimum value Hv may be set as the boundary determination value Ho. This boundary determination value Ho is highly likely to be a value close to the minimum value Hv to which the standard deviation converges, and it is also possible to reflect the results of measurements made in advance. Here, the minimum value Hv may be used as the boundary determination value.

From the viewpoint of the characteristic change of the standard deviation, it is also possible to apply a slope w that indicates the differential value of the characteristic curve of the standard deviation.

Therefore, in the present embodiment, blood vessel component presence/absence boundary acquisition processing is executed based on the OCT volume data, in which a boundary regarding the presence or absence of choroidal blood vessels is acquired using image feature amounts.

Next, the blood vessel component presence/absence boundary acquisition processing (step S22) is described in detail with reference to FIG. 9. The CPU 262 of the server 140 executes the image processing program to realize the image processing (image processing method) shown in the flowchart of FIG. 9.

Specifically, in step S220, the image processing unit 206 acquires OCT volume data 400, which is OCT data, for use in the blood vessel component presence/absence boundary acquisition processing. N planes having different depths are set for the OCT volume data 400, from a first plane f401 to an N-th plane f40N.

In step S221, the image processing unit 206 sets the parameter n to 1. The parameter n is a parameter indicating the number of en-face images (number of planes, number of layers).

In step S222, the image processor 206 analyzes the OCT volume data 400 and, for example, sets the first plane from the retinal pigment epithelium (hereinafter, referred to as the RPE layer) in the OCT volume data 400. The first plane may be set as a plane that is a predetermined number of pixels below the RPE layer; for example, 10 pixels below. The image processor 206 can specify, as the first plane f401, the RPE layer 400R as a reference plane. The RPE layer 400R can be identified by performing predetermined segmentation processing on the OCT volume data 400. In addition, the RPE layer may be specified by determining the most luminous layer in the OCT volume data 400 as the RPE layer.

Setting a plane 10 pixels below the RPE layer as the first plane is effective for generating an en-face image of a region in which choroidal blood vessels are present, the region deeper than the RPE layer (the region farther from the RPE layer as viewed from the center of the eyeball) being the choroidal region. There is no limitation to setting a plane 10 pixels below the RPE layer as the first plane, and the first plane may be a plane 10 pixels below the Bruch's membrane, which is located immediately below the RPE layer, for example. The Bruch's membrane is also identified by performing another predetermined segmentation processing on the OCT volume data 400 that is different from that for the RPE layer. Here, in order to specify the position 10 pixels below, the position may be 10 pixels below in the A-scan direction when the OCT volume data is generated.

Furthermore, the first plane is not limited to being specified as a plane 10 pixels below the RPE layer or the Bruch's membrane, and may be set to any number of pixels. Further, instead of being defined in terms of the number of pixels, it may be defined in terms of length such as in millimeters or nanometers. Furthermore, a spherical surface at a certain distance from the pupil or the center of the eyeball may be defined as a reference surface.

In step S223, the image processing unit 206 generates a first en-face image corresponding to the first plane that has been set. The en-face image may be generated from pixel values of pixels present in the first plane, or a shallow pixel group and a deep pixel group including the first plane may be extracted from the OCT volume data 400 and the pixel value may be calculated as the average or median of the luminance values of these pixels. When determining the pixel value, image processing such as noise removal may be used. The generated first en-face image corresponding to the first plane is stored in the RAM 266 by the processing unit 208.

In step S224, the image processing unit 206 derives an image feature amount relating to the nth (here, the first) en-face image. Here, the standard deviation value for the en-face image of the first plane is derived. The standard deviation value is derived using the pixel values of the pixels present in the en-face image. When deriving the image feature amount, the application range of the layer may be determined. For example, a process may be performed to determine a predetermined layer range as a range for deriving an image feature amount, and an image feature amount may be derived for the determined layer range. As the predetermined layer range, it is possible to apply a layer range in which the depth at which the boundary exists has been empirically confirmed (for example, a layer range from 80th layer to 120th layer).

In step S225, the image processing unit 206 uses the boundary determination value Ho to determine whether or not the standard deviation value corresponds to the boundary determination value Ho, thereby determining the boundary between the presence and absence of blood vessels. The boundary between the presence and absence of blood vessels is determined as an en-face image in which no blood vessel components exist, or as a boundary between adjacent en-face images in which a change in the presence or absence of blood vessels occurs.

In step S226, the image processing unit 206 determines whether or not a boundary has been detected based on the result of the determination of a boundary between the presence and absence of blood vessels, and in the case of an affirmative determination, the process proceeds to step S229, and in the case of a negative determination, the process proceeds to step S227.

When the boundary between the presence and absence of blood vessels is determined and the processing proceeds to step S229, the image processing unit 206 stores information indicating the boundary between the presence and absence of blood vessels. Specifically, in step S229, the processing unit 208 stores the determined position of the en-face image or the position between adjacent en-face images in the RAM 266 or the storage device 254, and ends the processing.

However, in step S227, the image processing unit 206 increments the parameter n (n=n+1), sets the nth plane in step S228, and returns the processing to step S223.

In this manner, the image processing unit 206 repeats the loop from step S223 to step S228 until the parameter n reaches the maximum number N.

Figure 9:
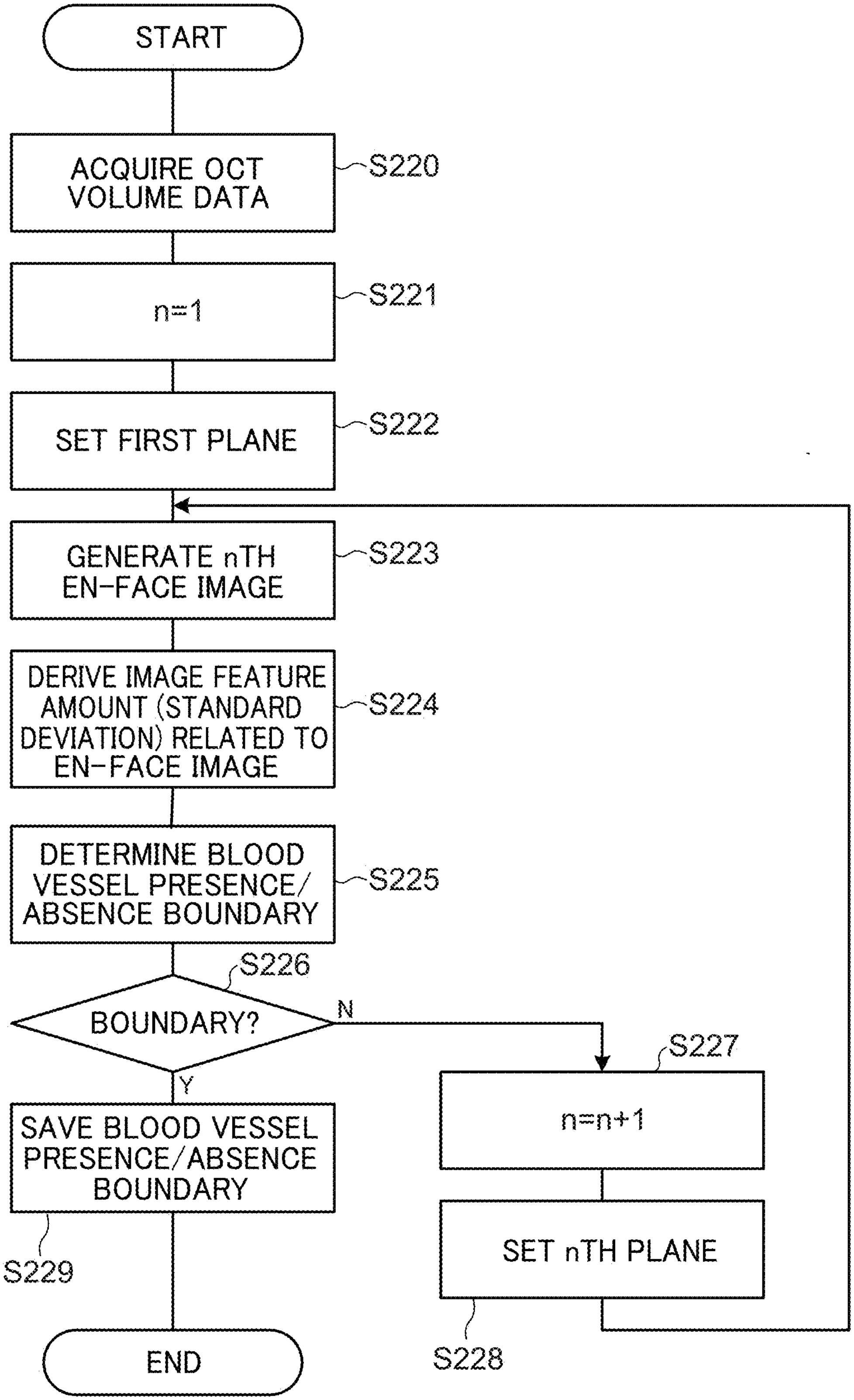
FIG. 9 is a flowchart showing an example of a flow of blood vessel component presence/absence boundary acquisition processing.

As a result of the image processing unit 206 executing the image processing shown in FIG. 9, it becomes possible to identify the boundary between the presence and absence of blood vessels, and by superimposing the boundary on the choroidal blood vessel image, the boundary between the blood vessel image and the noise image—for example, the portion corresponding to the sclera—can be visualized.

Next, the image formation processing of choroidal blood vessels for generating a stereoscopic image relating to the vortex vein (VV) in step S30 is described in detail with reference to FIG. 10.

Figure 10:
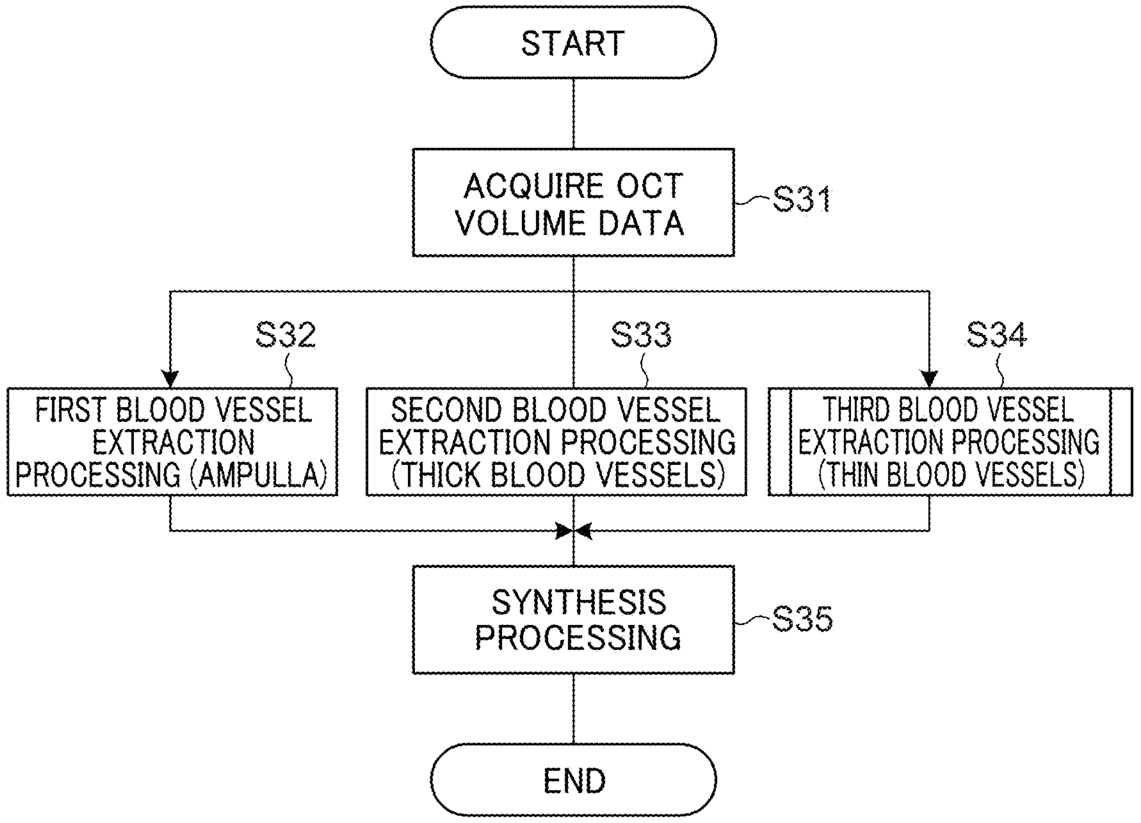
FIG. 10 is a flowchart showing an example of a flow of image formation processing for choroidal blood vessels.

In step S31 of FIG. 10, the image processing unit 206 extracts a region corresponding to the choroid from the OCT volume data 400 (see FIG. 13) acquired in step S20, and based on the extracted region, OCT volume data for the choroid portion is extracted (acquired).

Specifically, the image processing unit 206 acquires OCT volume data for extracting choroidal blood vessels. Acquiring the OCT volume data may involve processing to extract a portion of OCT volume data scanned so as to include the vortex vein and the choroidal blood vessels surrounding the vortex vein. For example, OCT volume data 400D of the region below the RPE layer may be extracted. In addition, OCT volume data 400D of a region determined to have a blood vessel component in the above-described blood vessel component presence/absence boundary acquisition processing may be extracted.

Next, in step S32, the image processing unit 206 executes first blood vessel extraction processing (ampulla extraction) using the OCT volume data 400D. The first blood vessel extraction processing is processing for extracting choroidal blood vessels forming the ampulla (hereinafter, referred to as the ampulla), which is a first blood vessel.

As preprocessing of the first blood vessel extraction processing (ampulla extraction), the image processing unit 206 executes processing subjecting the OCT volume data 400D to binarization processing, and then performs noise removal processing. In order to remove the noise region, the image processor 206 subjects the binarized OCT volume data 400D to a median filter, opening processing, shrinking processing, or the like to remove the noise region.

Next, in order to smooth the surface of the extracted ampulla, the image processing unit 206 executes segmentation processing (image processing such as active contouring, graph cutting, or U-net) on the OCT volume data from which the noise region has been removed. Here, "segmentation" refers to image processing that performs binarization processing to separate the background and foreground of the image to be analyzed.

Figure 15:
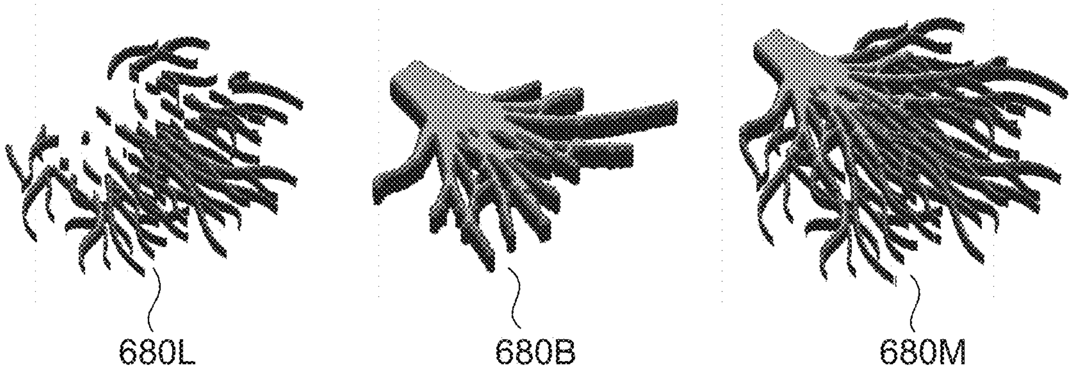
FIG. 15 is a conceptual diagram of stereoscopic images of a vortex vein.

As a result of performing this first blood vessel extraction processing, only the region of the ampulla remains from the OCT volume data 400D, and the stereoscopic image 680B of the ampulla blood vessels shown in FIG. 15 is generated. The image data of the stereoscopic image 680B of the blood vessels of the ampulla is stored in the RAM 266 by the processing unit 208.

Furthermore, in step S33 shown in FIG. 10, the image processing unit 206 executes second blood vessel extraction processing (thick blood vessel extraction) using the OCT volume data 400D. The second blood vessel extraction processing is processing for extracting choroidal blood vessels (thick blood vessels) that are thick linear second blood vessels progressing from the ampulla and that exceed a predetermined threshold value; i.e., a predetermined diameter. In the second blood vessel extraction processing (thick blood vessel extraction), linear second blood vessels progressing from the ampulla are extracted. These thick blood vessels mainly represent blood vessels located in the Haller's layer.

The predetermined threshold value (i.e., the predetermined diameter) may be a numerical value that is determined in advance so as to leave blood vessels with a diameter of several hundred microns as thick blood vessels. In addition, a threshold value determined so as to leave thin blood vessels, which are described below, may be a numerical value that is less than the several hundred microns in diameter determined so as to leave thick blood vessels, and a numerical value may be set that is smaller than the numerical value that is predetermined so as to leave a thick blood vessel. For example, it is possible to use a numerical value predetermined so as to leave blood vessels with a diameter of several tens of microns as thin blood vessels.

The image processing unit 206 executes image processing to perform pre-processing on the OCT volume data 400D. An example of pre-processing is blurring processing such as noise removal. Processing that removes the influence of speckle noise and extracts linear blood vessels that accurately reflect the blood vessel shapes can be applied to the blurring processing. Speckle noise processing includes Gaussian blur processing.

Next, the image processing unit 206 performs line extraction processing (extraction of thick linear blood vessels) on the pre-processed OCT volume data 400D, and a second choroidal blood vessel, which is a thick linear portion, is extracted from the OCT volume data 400D. In the second choroidal vessel extraction processing, image processing using an eigenvalue filter, a Gabor filter, or the like is performed, for example, and a linear blood vessel region is extracted from the OCT volume data 400D.

The image processing unit 206 executes image processing to perform binarization processing on the OCT volume data 400D, the binarized linear blood vessel region is subjected to image processing such as processing for removing isolated regions that are not connected to surrounding blood vessels, median filter processing, opening processing, and shrinking processing, and small discrete regions are removed.

By the foregoing image processing, a second stereoscopic image of the second choroidal blood vessels, which are thick blood vessels, is generated.

By performing the second blood vessel extraction processing described above, only the region of the thick blood vessels remains from the OCT volume data 400D, and the stereoscopic image 680L of the thick blood vessels shown in FIG. 15 is generated. The image data of the stereoscopic image 680L of the thick blood vessels is stored in the RAM 266 by the processing unit 208.

Figure 5:
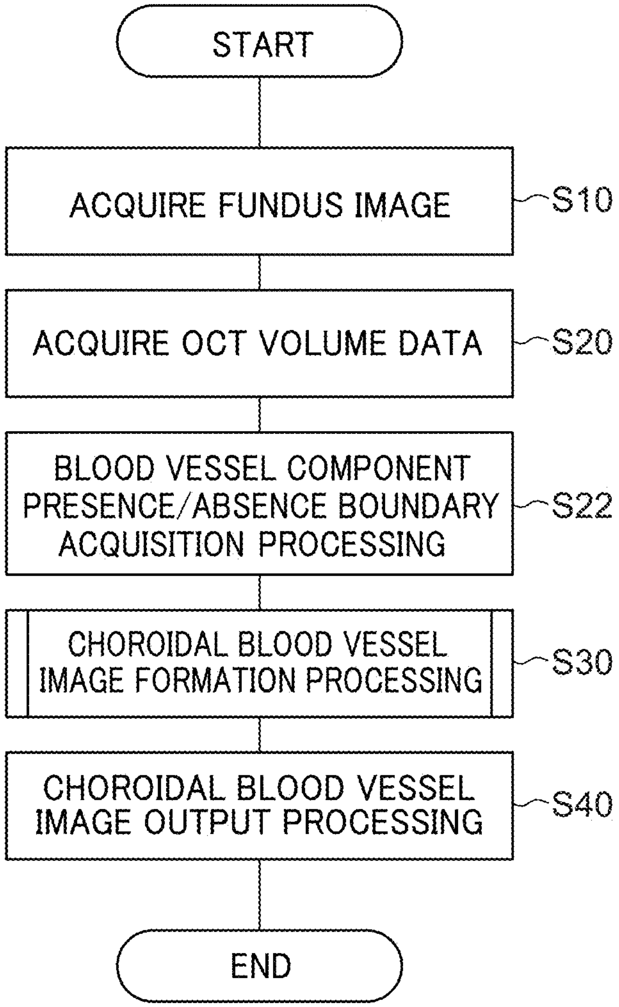
FIG. 5 is a flowchart showing an example of a flow of image processing by a server.
Figure 16:
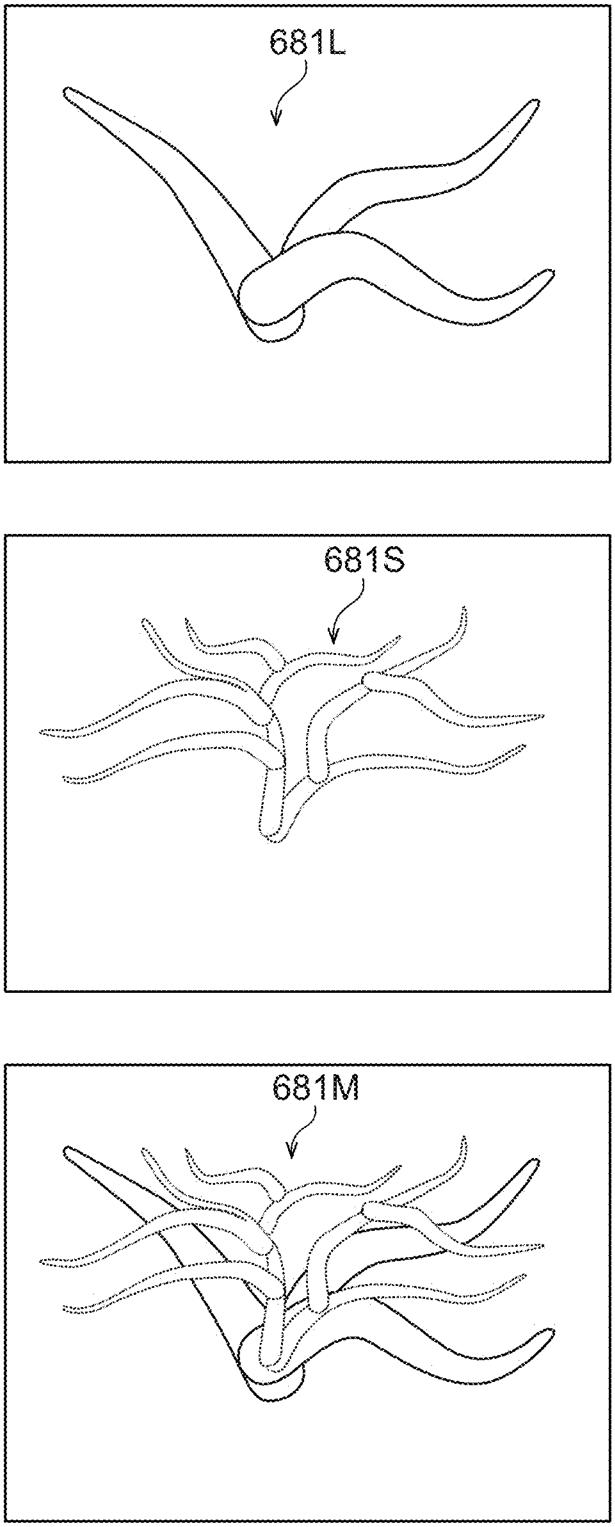
FIG. 16 is a diagram showing an example of a stereoscopic image of choroidal vessels around a vortex vein.

Further, FIG. 16 shows an example of a stereoscopic image of the choroidal blood vessels around the vortex vein VV obtained by the above-described image processing (FIG. 5).

By performing the second blood vessel extraction processing described above, only the region of the thick blood vessels remains from the OCT volume data 400D, and the stereoscopic image 681L of the thick blood vessels shown in FIG. 16 is generated. The image data of the stereoscopic image 681L of the thick blood vessels is stored in the RAM 266 by the processing unit 208.

The image processing unit 206 aligns the stereoscopic image 680B of the ampulla and the stereoscopic image 680L of the linear blood vessels, and calculates the logical sum of both images, whereby the stereoscopic image 680L of the linear blood vessels and the stereoscopic image 680B of the ampulla are synthesized. This makes it possible to generate a stereoscopic image 680M (FIG. 15) of the choroidal blood vessels, including the vortex veins, which are thick blood vessels. In the processing for extracting the thick blood vessels described above, thin blood vessels having a diameter smaller than the predetermined diameter are removed.

Incidentally, when observing vortex veins, in addition to the thick blood vessels located in the Haller's layer, it is also important to observe the thin blood vessels, which are primarily located in the Sattler's layer. For example, analysis of thin blood vessels in the Sattler's layer functions effectively in the diagnosis of pachychoroid diseases and the like. Therefore, the present disclosure includes processing for extracting choroidal blood vessels (thin blood vessels) that are thin linear third blood vessels progressing from the ampulla and that have a predetermined diameter equal to or smaller than a predetermined threshold value; i.e., a predetermined specific diameter.

Figure 11:
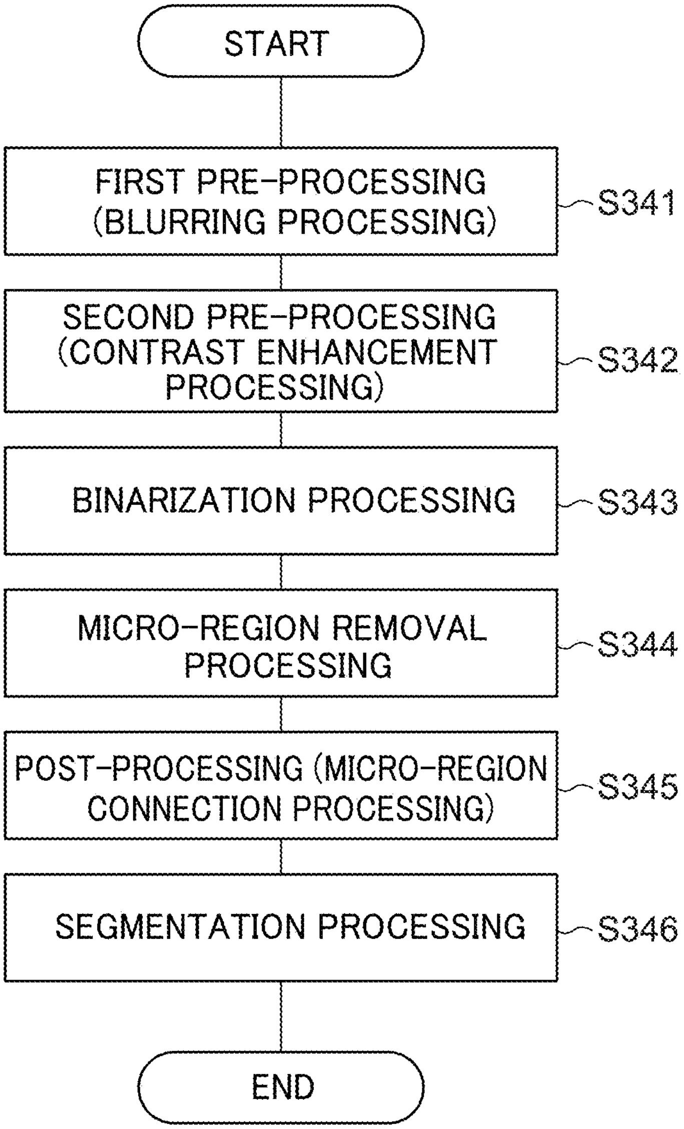
FIG. 11 is a flowchart showing an example of a flow of third image processing by third blood vessel extraction processing.

Specifically, in step S34 shown in FIG. 10, the image processing unit 206 executes third blood vessel extraction processing (thin blood vessel extraction) using the OCT volume data 400D. The third blood vessel extraction processing is processing for extracting choroidal blood vessels (thin blood vessels) that are thin linear third blood vessels progressing from the ampulla and that are equal to or smaller than a predetermined threshold value; i.e., a predetermined diameter. In the third blood vessel extraction processing (thin blood vessel extraction), linear third blood vessels progressing from the ampulla are extracted. The thin blood vessels primarily represent blood vessels located in the Sattler's layer. In the third blood vessel extraction processing (thin blood vessel extraction), the third image processing shown in FIG. 11 is executed.

In the processing for extracting the third blood vessels, which are thin blood vessels, the image processing unit 206 performs preprocessing for thin blood vessels, including first and second preprocessing, with respect to the OCT volume data 400D. First, in step S341 shown in FIG. 11, image processing is executed to perform first pre-processing on the OCT volume data 400D. An example of the first pre-processing is blurring processing, which is an example of processing for removing noise.

In the next step S342, the image processing unit 206 executes image processing to perform second pre-processing on the OCT volume data 400D that has been subjected to the first pre-processing. An example of the second pre-processing is the application of contrast enhancement processing. Contrast enhancement processing functions effectively when extracting thin blood vessels. Contrast enhancement processing is processing for increasing the contrast of an image compared to before the processing; that is, processing for increasing the difference between lightness and darkness. For example, the difference between the maximum and minimum values of the degree of brightness (for example, luminance) is increased by a predetermined value from the difference value before processing. The predetermined value can be set appropriately.

When an image that has been subjected to the above-described contrast enhancement processing is binarized, thin blood vessels appear as continuous lines, making it possible to reduce the occurrence of separation of continuous thin blood vessels.

Here, in step S342, the image processing unit 206 performs image processing using, for example, an eigenvalue filter, a Gabor filter, or the like, and it is possible to extract regions of linear blood vessels, which are thin blood vessels, from the OCT volume data 400D.

Next, in step S343 shown in FIG. 11, the image processing unit 206 executes image processing to perform binarization processing on the OCT volume data 400D that has been subjected to the contrast enhancement processing. Specifically, by setting the binarization threshold value to a predetermined threshold value that leaves thin blood vessels, thin blood vessels in the OCT volume data D become black pixels and other parts become white pixels.

Furthermore, in step S344, the image processing unit 206 removes discrete micro-regions from the binarized image (the region including thin blood vessels). Here, image processing is performed, such as removing speckle noise and areas that are isolated at a predetermined distance and are presumed not to be continuous with the surrounding blood vessels, to remove discrete micro-areas.

In the next step S345, as post-processing, the image processing unit 206 performs micro-region connection processing on the OCT volume data 400D from which the micro-regions have been removed, whereby third choroidal blood vessels, which are thin blood vessels in a thin linear portion, are extracted from the OCT volume data 400D. Specifically, the image processing unit 206 performs image processing using morphological processing such as closing processing, and by connecting the discretely detected thin blood vessels, the third choroidal blood vessels, which are thin blood vessels, are extracted from the OCT volume data 400D. Specifically, third choroidal blood vessels within a predetermined distance are connected. The image that has been subjected to the micro-region connection processing, even in the case of a thin blood vessel having a region of large curvature, appears as a continuous line, making it possible to reduce separation of continuous thin blood vessels.

In addition, in step S346, the image processing unit 206, in order to smooth the surfaces of the extracted thin blood vessels, executes segmentation processing (image processing such as active contouring, graph cutting, or U-net) on the above-described OCT volume data in which the micro-regions has been connected. That is, the image to be analyzed is subjected to processing for separating the background and foreground.

By the foregoing image processing, a third stereoscopic image of the third choroidal blood vessels, which are thin blood vessels, is generated.

By performing the third blood vessel extraction processing described above, only the region of thin blood vessels remains from the OCT volume data 400D, and the three-dimensional image 681S of the thin blood vessels shown in FIG. 16 is generated. The image data of the stereoscopic image 681S of the thin blood vessels is stored in the RAM 266 by the processing unit 208.

The processing order of steps S32, S33, S34 is not limited to the above-mentioned processing order, and any one of these processings may be executed first, or the processings may be executed simultaneously in parallel.

When the processing of steps S32, S33, S34 is completed, in step S35, the image processing unit 206 reads out from the RAM 266 a stereoscopic image of the ampulla, a stereoscopic image of the thick blood vessels, and a stereoscopic image of the thin blood vessels. Then, these stereoscopic images are aligned and the logical sum of each image is calculated, whereby the stereoscopic image of the ampulla, the stereoscopic image of the thick blood vessels, and the stereoscopic image of the thin blood vessels are synthesized. As a result, a stereoscopic image 681M (see FIG. 16) of the choroidal blood vessels including the vortex veins is generated. The image data of the stereoscopic image 681M is stored in the RAM 266 or the storage device 254 by the processing unit 208.

Furthermore, information indicating the boundary between the presence and absence of blood vessels obtained by the above-described blood vessel component presence/absence boundary acquisition processing (FIG. 9) is also read out from the RAM 266 and synthesized into the synthesized stereoscopic image. The image data of the stereoscopic image 681M, in which information indicating the boundary between the presence and absence of blood vessels is configured, is stored in the RAM 266 or the storage device 254 by the processing unit 208.

A display screen for displaying a generated stereoscopic image (3D image) of choroidal blood vessels including vortex veins is described below. The display screen is generated by the display control unit 204 of the server 140 based on a user's instruction, and is output as an image signal to the viewer 150 by the processing unit 208. The viewer 150 displays the display screen based on the image signal.

In FIG. 17, a display screen 500A is shown. As shown in FIG. 17, the display screen 500A has an information area 502 and an image display area 504A. The image display area 504A includes a comment field 506 that displays a patient's medical history.

The information area 502 has a patient ID display field 512, a patient name display field 514, an age display field 516, a visual acuity display field 518, a right eye/left eye display field 520, and an axial length display field 522. In each of the display areas, from the patient ID display field 512 to the axial length display field 522, the viewer 150 displays the respective information based on the information received from the server 140.

The image display area 504A is a region mainly for displaying an image of the subject eye and the like. The image display area 504A is provided with the following display fields; specifically, it includes a UWF fundus image display field 542 and a choroidal blood vessel stereoscopic image display field 548. Although not shown, an OCT volume data conceptual diagram display field and a tomographic image display field 546 can be displayed in a superimposed manner in the image display area 504A.

The comment field 506 included in the image display area 504A functions as a display of the patient's medical history, and as a notes section where the user (ophthalmologist) can optionally enter the observation results and diagnosis results.

In the UWF fundus image display field 542, a UWF-SLO fundus image 542B obtained by imaging the fundus of the subject eye with the ophthalmic device 110 is displayed. A range 542A indicating the position from which the OCT volume data was acquired is superimposed on the UWF-SLO fundus image 542B. In a case in which there are multiple OCT volume data associated with the UWF-SLO image, plural ranges may be displayed in an overlapping manner, and the user may select one position from among the plural ranges. FIG. 17 shows that the range including the vortex vein in the upper right corner of the UWF-SLO image was scanned.

In the choroidal blood vessel stereoscopic image display field 548, a stereoscopic image (3D image) 548B of choroidal blood vessels obtained by image processing the OCT volume data is displayed. The stereoscopic image 548B can be rotated on three axes by user operation. In addition, the stereoscopic image 548B of the choroidal blood vessels can display an image of the second choroidal blood vessels (a stereoscopic image of thick blood vessels) and an image of the third choroidal blood vessels (a stereoscopic image of thin blood vessels) proceeding from the ampulla 548X in different display forms. In FIG. 17, a stereoscopic image 548L of thick blood vessels proceeding from the ampulla 548X is shown by a solid line, and a stereoscopic image 548S of thin blood vessels is shown by a dotted line. Furthermore, the stereoscopic image 548L of the thick blood vessels and the stereoscopic image 548S of the thin blood vessels may be displayed in different colors, or the background (fill-in) of the images may be displayed in different forms.

Moreover, in the choroidal blood vessel stereoscopic image display field 548, the boundary between the presence and absence of choroidal blood vessels acquired by the above-described blood vessel component presence/absence boundary acquisition processing is superimposed and displayed. FIG. 17 shows an example in which a layer boundary 548P is displayed by a thick solid line. This boundary 548P is a boundary related to the presence or absence of choroidal blood vessels, and enables confirmation of areas containing blood vessel components, thereby enabling appropriate treatment for the patient. Further, it is also possible to perform quantitative measurements of, for example, blood vessel depth with high accuracy.

The image display area 504A of the display screen 500A enables a stereoscopic image of the choroidal blood vessels, including the thick and thin blood vessels, to be checked. By scanning the range including the vortex vein, it is possible to display a stereoscopic image of the vortex vein and the choroidal blood vessels, including the thick blood vessels and thin blood vessels, around it, and furthermore, by superimposing and displaying the boundary between the presence and absence of choroidal blood vessels, the user can obtain more information for diagnosis.

Since, as described above, in the present embodiment, it is possible to obtain the boundary between the presence and absence of choroidal blood vessels based on OCT volume data including the choroid, it is possible to visualize the boundary indicating the presence or absence of choroidal blood vessels in three dimensions together with the choroidal blood vessels.

In the foregoing description, a case is explained in which the boundary is identified using image feature amounts; however, the invention is not limited to image feature amounts that change depending on the presence or absence of blood vessel components. For example, information related to the choroidal blood vessels may be used to identify the boundary. The choroidal blood vessels gradually narrow with increasing layer depth. In the present disclosure, it is also possible to identify the boundary by supplementary use of information related to the depth of a layer in the fundus and information related to the diameter of the choroidal blood vessels at such depth. Specifically, it is possible to detect the thickness of the choroidal blood vessels or the degree to which the thickness of the choroidal blood vessels changes in the depth direction, and to identify the boundary based on this thickness or degree and a predetermined threshold value. For example, when using respective information related to the thickness of the choroidal blood vessels and a threshold value, it is possible to predetermine a threshold value indicating the thickness corresponding to the boundary, and to identify a layer in which the thickness of the choroidal blood vessels is equal to or smaller than the threshold value as the boundary. In addition, when using the respective information related to the degree and the threshold value, it is possible to predetermine a threshold value indicating the degree of change corresponding to the boundary, and to identify a layer in which the degree of change in the thickness of choroidal blood vessels is equal to or less than the threshold value as the boundary.

In the above-described embodiment, the image processing (FIG. 5) is executed by the server 140; however, the present disclosure is not limited in this respect, and it may be performed by the ophthalmic device 110, the viewer 150, or an additional image processing device further provided at the network 130.

In the present disclosure, each component (device, etc.) may be present either singly or in plural, to the extent that contradiction is avoided.

In each of the above-described examples, cases have been exemplified in which image processing is performed by a software configuration using a computer; however, the present disclosure is not limited in this respect, and at least a part of the processing may be realized by a hardware configuration. In addition, in the foregoing description, a CPU has been used as an example of a general-purpose processor; however, the term "processor" refers to a processor in a broad sense, and includes general-purpose processors (such as a CPU: Central Processing Unit) and dedicated processors (such as a GPU: Graphics Processing Unit, ASIC: Application Specific Integrated Circuit, or FPGA: Field Programmable Gate Array, programmable logic device). Therefore, the image processing may be performed only by a hardware configuration, or a part of the image processing may be performed by a software configuration and the remaining part of the image processing may be performed by a hardware configuration.

Further, the operations of the above-described processors may not only be performed by a single processor, but may also be performed by multiple processors working together, or may be performed by multiple processors located in physically separate locations working together.

Further, in order to cause a computer to execute the above-described processing, a program describing the above-described processing in computer-processable code may be stored on a storage medium such as an optical disk and distributed.

In this way, the present disclosure includes cases in which image processing is realized by a software configuration using a computer and cases in which it is not realized thus and, therefore, includes the following techniques.

First Technique

An image processing device, including:

- an acquisition unit that acquires OCT volume data including a choroid;
- a generation unit that generates plural en-face images corresponding to plural planes having different depths, based on the OCT volume data;
- a derivation unit that derives an image feature amount in each of the plural en-face images; and
- a determination unit that determines, as a boundary, an interval between en-face images in which the image feature amounts indicate a switch between presence and absence of choroidal blood vessels, based on the respective image feature amounts.

Second Technique

An image processing method, including:

- a step of an acquisition unit acquiring OCT volume data including a choroid;
- a step of a generation unit generating plural en-face images corresponding to plural planes having different depths, based on the OCT volume data;
- a step of a derivation unit deriving an image feature amount in each of the plural en-face images; and
- a step of a determination unit determining, as a boundary, an interval between en-face images in which the image feature amounts indicate a switch between presence and absence of choroidal blood vessels, based on the respective image feature amounts.

The image processing unit 206 is an example of the "acquisition unit", the "generation unit", the derivation unit, and the determination unit of the present disclosure.

Based on the foregoing disclosure, the following techniques are proposed.

Third Technique

A computer program product for image processing, the computer program product being provided with a computer-readable storage medium that is not itself a temporary signal, the computer-readable storage medium having a program stored therein, and the program causing a processor to perform:

- a step of acquiring OCT volume data including a choroid;
- a step of generating plural en-face images corresponding to plural planes having different depths, based on the OCT volume data;
- a step of deriving an image feature amount in each of the plural en-face images; and
- a step of identifying, as a boundary, an interval between en-face images in which the image feature amounts indicate a switch between presence and absence of choroidal blood vessels, based on the respective image feature amounts.

The server 140 is an example of a "computer program product" of the present disclosure.

While the technique of the present disclosure has been described above using the embodiments, the above-described image processing is merely an example, and the technical scope of the present disclosure is not limited to the scope described in the above-described embodiments. Therefore, various modifications or improvements can be made to the above-described embodiments, such as deleting unnecessary processing, adding new processing, or changing the order of the processing, within a range that does not depart from the gist of the invention, and such modified or improved aspects are also included in the technical scope of the present disclosure.

The disclosure of Japanese Patent Application No. 2022-066636 is incorporated herein by reference in its entirety. All documents, patent applications, and technical standards described in the present specification are incorporated by reference in the present specification to the same extent as if the individual documents, patent applications, and technical standards were specifically and individually stated to be incorporated by reference.

The invention claimed is:

1. An image processing method performed by a processor, the method comprising:

a step of acquiring OCT volume data including a choroid;

a step of generating a plurality of en-face images corresponding to a plurality of planes having different depths, based on the OCT volume data;

a step of deriving an image feature amount in each of the plurality of en-face images; and a step of identifying, as a boundary, an interval between en-face images in which the image feature amounts indicate a switch between presence and absence of choroidal blood vessels, based on the respective image feature amounts.

2. The image processing method of claim 1, wherein:

the step of deriving the image feature amount includes a step of calculating a standard deviation related to brightness of each of the plurality of en-face images, and the step of identifying the boundary includes a step of identifying, as the boundary, a layer corresponding to a position of an en-face image at which the standard deviation converges, based on the standard deviation of each of the plurality of en-face images.

3. The image processing method of claim 2, wherein the step of identifying the boundary determines a threshold value of standard deviation that determines the boundary, based on the layer corresponding to the position of the en-face image at which the standard deviation converges.

4. The image processing method of claim 1, wherein:

the step of deriving the image feature amount includes a step of calculating a standard deviation related to brightness of each of the plurality of en-face images, and the step of identifying the boundary includes a step of identifying, as the boundary, a layer corresponding to a position of an en-face image indicating a predetermined threshold value for the standard deviation, based on the standard deviation of each of the plurality of en-face images.

5. The image processing method of claim 4, further comprising:

a step of extracting a choroidal blood vessel from each of the plurality of en-face images; and a step of detecting a degree to which a thickness of the extracted choroidal blood vessel changes with respect to a depth direction, wherein the step of identifying the boundary includes a step of identifying the boundary based on the threshold value and the degree.

6. The image processing method of claim 1, wherein:

the step of deriving the image feature amount includes:

a step of calculating a standard deviation related to brightness of each of the plurality of en-face images; and a step of deriving a trend in change of standard deviation between the plurality of en-face images as the image feature amount, and the step of determining the boundary includes a step of determining, as the boundary, a layer corresponding to a position of an en-face image indicating a predetermined threshold value for a trend in change of standard deviation, based on the trend in change of standard deviation of each of the plurality of en-face images.

7. The image processing method of claim 1, wherein:

the step of deriving the image feature amount includes a step of calculating entropy related to image brightness in each of the plurality of en-face images, and the step of determining the boundary includes a step of determining, as the boundary, a layer corresponding to a position of an en-face image indicating a predetermined threshold value for entropy, based on the entropy in each of the plurality of en-face images.

8. The image processing method of claim 1, wherein the step of deriving the image feature amount derives the image feature amount from only a portion of the en-face images among the plurality of en-face images that are generated.

9. The image processing method of claim 1, wherein the step of acquiring the OCT volume data scans a region of a fundus including at least a vortex vein to acquire the OCT volume data.

10. An image processing device, comprising a processor, the processor being configured to execute:

a step of acquiring OCT volume data including a choroid;

a step of generating a plurality of en-face images corresponding to a plurality of planes having different depths, based on the OCT volume data;

a step of deriving an image feature amount in each of the plurality of en-face images; and a step of identifying, as a boundary, an interval between en-face images in which the image feature amounts indicate a switch between presence and absence of choroidal blood vessels, based on the respective image feature amounts.

11. A non-transitory recording medium storing a program for performing image processing, the program causing a processor to execute:

a step of acquiring OCT volume data including a choroid;

a step of generating a plurality of en-face images corresponding to a plurality of planes having different depths, based on the OCT volume data;

a step of deriving an image feature amount in each of the plurality of en-face images; and a step of identifying, as a boundary, an interval between en-face images in which the image feature amounts indicate a switch between presence and absence of choroidal blood vessels, based on the respective image feature amounts.

* * * * *